Feb. 22, 1966  G. L. CLAPPER  3,236,947
WORD CODE GENERATOR
Filed Dec. 21, 1961  17 Sheets-Sheet 1

INVENTOR
GENUNG L. CLAPPER

BY *William N. Barret*
ATTORNEY

Feb. 22, 1966  G. L. CLAPPER  3,236,947
WORD CODE GENERATOR
Filed Dec. 21, 1961  17 Sheets-Sheet 4

Feb. 22, 1966 G. L. CLAPPER 3,236,947
WORD CODE GENERATOR
Filed Dec. 21, 1961 17 Sheets-Sheet 5
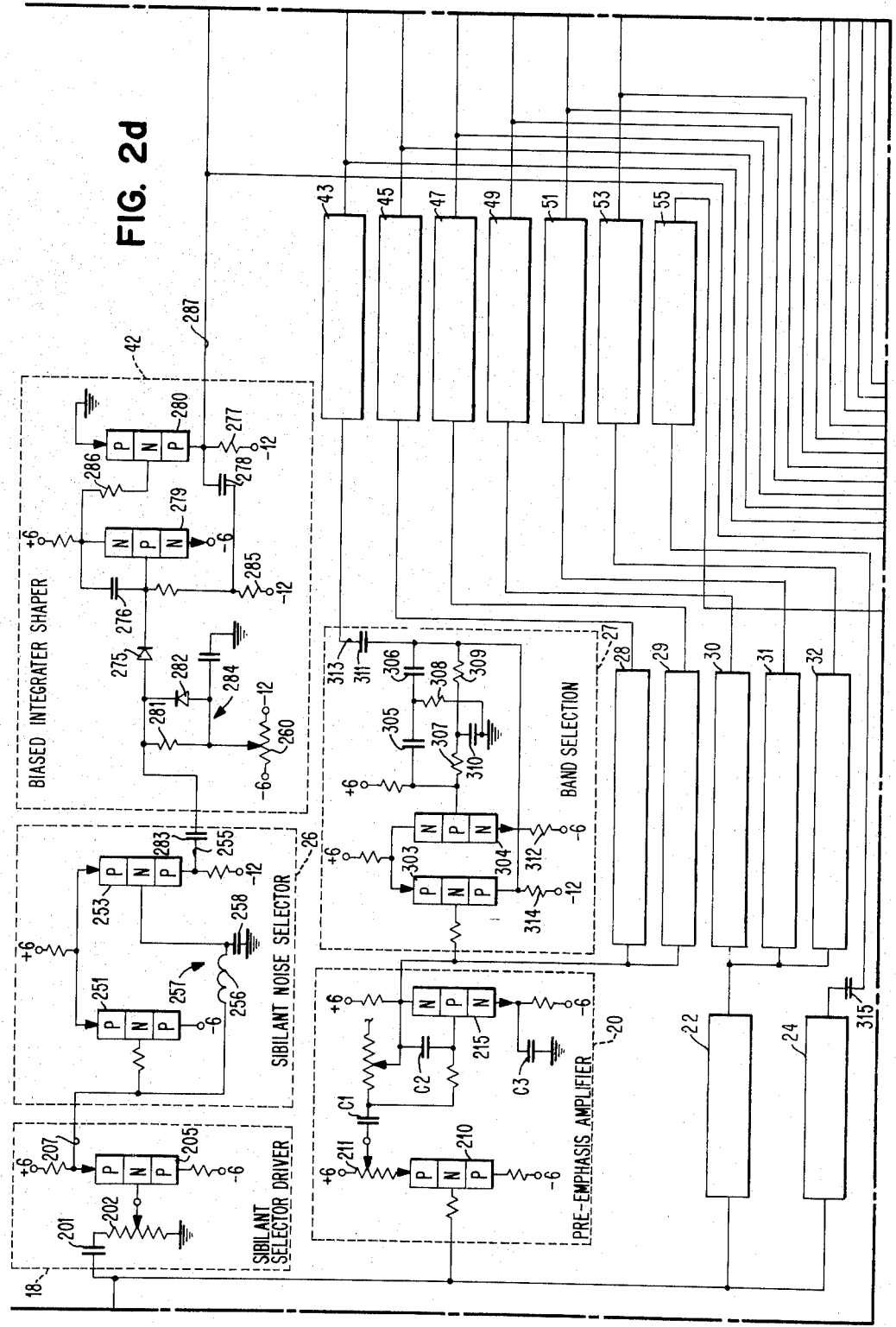

Feb. 22, 1966  G. L. CLAPPER  3,236,947
WORD CODE GENERATOR
Filed Dec. 21, 1961  17 Sheets-Sheet 7

Feb. 22, 1966    G. L. CLAPPER    3,236,947
WORD CODE GENERATOR
Filed Dec. 21, 1961    17 Sheets-Sheet 9

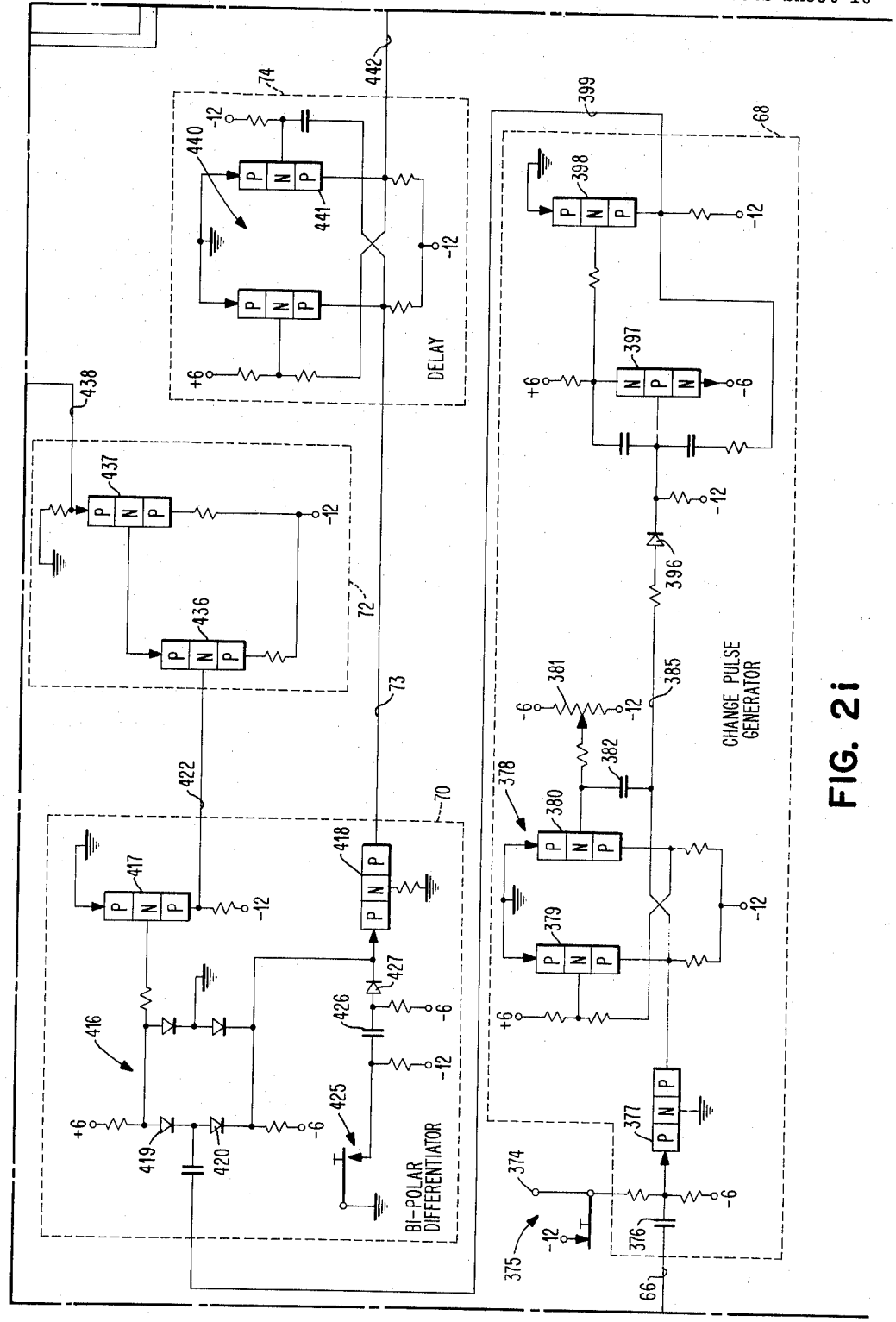

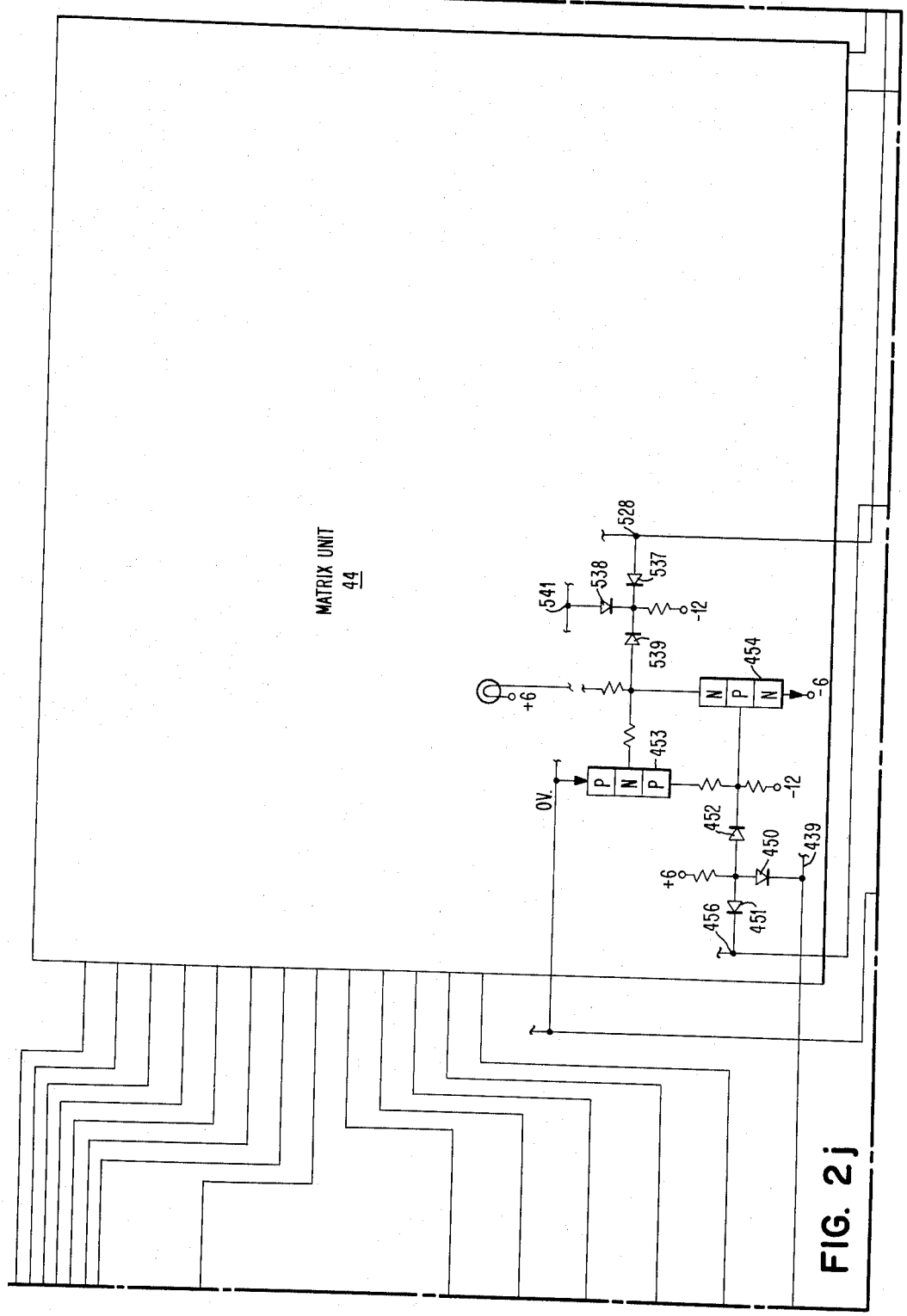

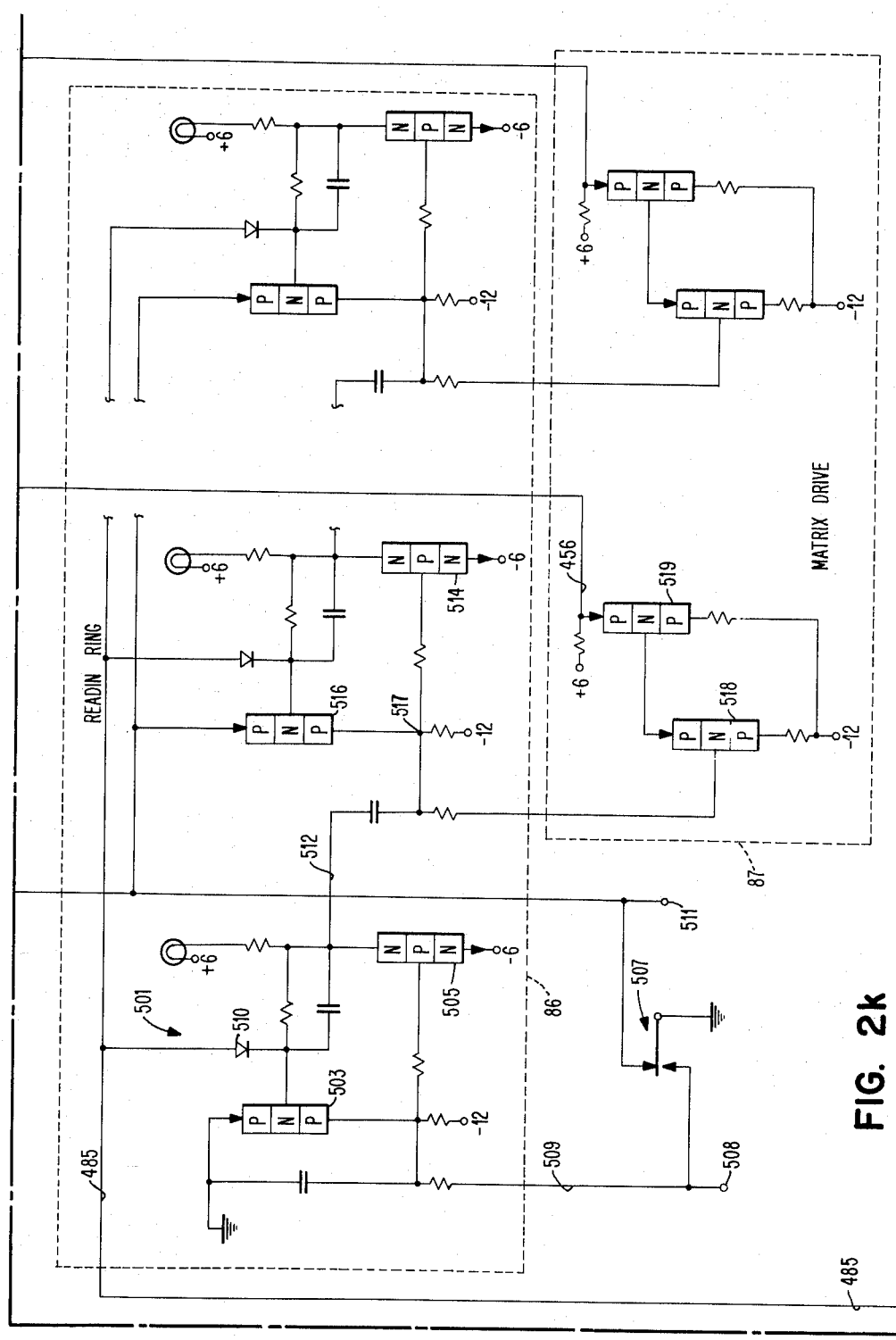

Feb. 22, 1966   G. L. CLAPPER   3,236,947
WORD CODE GENERATOR
Filed Dec. 21, 1961   17 Sheets-Sheet 13

Feb. 22, 1966  G. L. CLAPPER  3,236,947
WORD CODE GENERATOR
Filed Dec. 21, 1961  17 Sheets-Sheet 14

Feb. 22, 1966     G. L. CLAPPER     3,236,947
WORD CODE GENERATOR
Filed Dec. 21, 1961     17 Sheets-Sheet 16
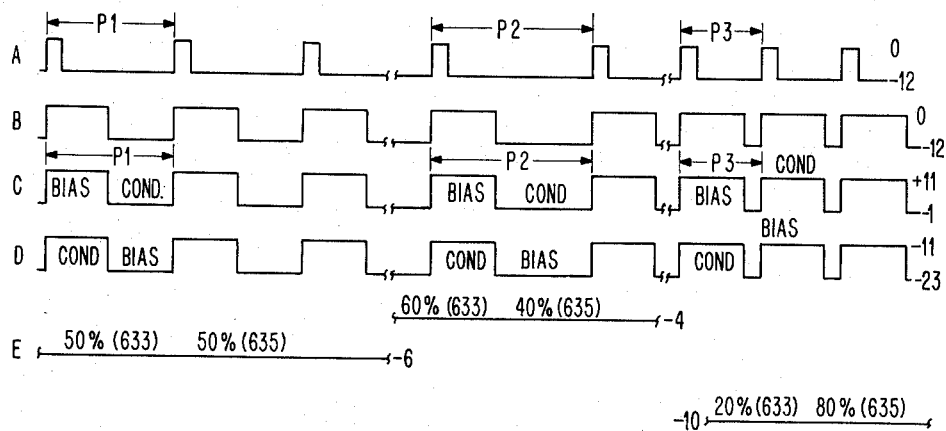
FIG. 4
| OUTPUT 48 | OUTPUT 645 | RISING 667 | FALLING 669 | VOICE 58 | CODE 57 | CODE 52 | MEANING |
|---|---|---|---|---|---|---|---|
|  |  | 1 | 1 | 0 | 0 | 0 | NO VOICE |
|  |  | 1 | 0 | 1 | 1 | 0 | RISING VOICE |
|  |  | 0 | 1 | 1 | 0 | 1 | FALLING VOICE |
|  |  | 1 | 1 | 1 | 1 | 1 | STEADY VOICE |
FIG. 5
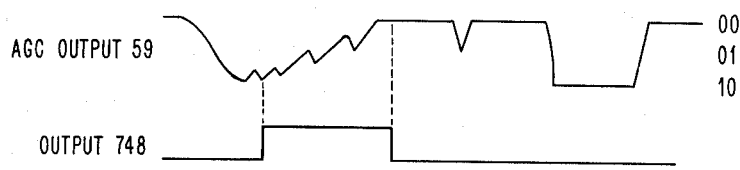
FIG. 6

Feb. 22, 1966

G. L. CLAPPER 3,236,947

WORD CODE GENERATOR

Filed Dec. 21, 1961

| FIG. 2a | FIG. 2d | FIG. 2g | FIG. 2j | FIG. 2m |
| --- | --- | --- | --- | --- |
| FIG. 2b | FIG. 2e | FIG. 2h | FIG. 2k | |
| FIG. 2c | FIG. 2f | FIG. 2i | FIG. 2l | |

FIG. 7

United States Patent Office 3,236,947
Patented Feb. 22, 1966

3,236,947
WORD CODE GENERATOR
Genung L. Clapper, Vestal, N.Y., assignor to International Business Machines Corporation, New York, N.Y., a corporation of New York
Filed Dec. 21, 1961, Ser. No. 161,089
28 Claims. (Cl. 179—1)

The present invention relates to apparatus for eliminating redundancy in digital data. In particular, the present invention relates to apparatus in which a speech or sound waveform is analyzed to obtain a compact digital code.

In the past, attempts have been made to analyze speech and generate a digital code. While there has been some success in recognizing a limited number of words for a given speaker, there has been no successful general purpose equipment.

This would appear to result from two interrelated problems.

(1) The variables contained in speech indicative of intelligence have not been fully recognized.

(2) In generating an error-free digital code, large quantities of data have made the results unusable.

Previous apparatus has been made to analyze complex waves for selected variables, generate data indicative of these variables, periodically sample the data generated, and store this data concerning each variable during each period of time. If the times between sampling is too large, the possibility of error is also large since changes between sample time will be ignored. On the other hand, if the frequency of sampling is high enough to avoid the possibility of error, tremendous quantities of redundant data are obtained which reduces the effectiveness of the results to unusable proportions.

In solving this impasse, the present invention provides means for analyzing a complex wave continuously for selected variables; generating a digital code representative of these variables; monitoring the generated digital code to detect changes and sampling the digital code to generate an output only upon change. In this invention, therefore, the digital code which is sampled will be accurate since any predetermined change in any variable in the complex waveform will effect the coded output. The amount of output data will be small since output data will be generated only when the original digital data changes to a value different than it was at a previous instant of time. The present invention further contemplates generating as a portion of the coded output an indication of the time period between changes, if necessary. This, of course, will depend primarily on the monitored variables.

In general, the voice is made up of two separate sources of sound. First and most often utilized are the sounds generated by the vocal chords as air from the lungs is passed through the same. The waveform of the sound generated at the vocal chords is a sawtooth which it is recognized contains all frequencies when analyzed into Fourier components. This sawtooth waveform is not however transmitted as sound external to the speaker but is resonated by cavities formed by the mouth and tongue and lips so that the externally generated sound will be those frequencies contained in the sawtooth which are acoustically resonant with the sounding box formed by the mouth, tongue, teeth, and lips which is transmitted to the external hearer. These sounds are called voiced sounds.

The vowels are the largest single class of voiced sound. These are of course a, e, i, o, u and sometimes y. For example, the sound of the first e in "even" consists of a low tone resonated by the mouth and throat cavity with an added overtone with a much higher frequency. The high overtone resonates in a small cavity formed by the tip of the tongue and the upper front teeth. Thus the modification of the sawtooth sound from the vocal chords by the resonant chambers produces a complex waveform consisting of more than one frequency component. The vowels and vowel-like consonants m, n, g, w, and l are characterized by more or less of a musical sound. Each vowel has a characteristic distribution of frequency components. A change in the vowel resonance produced by a slight flattening of the tongue, for example, differentiates the final short e from the initial long e in the word "even."

Another source of sound is the hiss of the breath outflow. Since the vocal chords are not used in generating these sounds, they are described as unvoiced. The ratio of voiced to unvoiced sounds in the English language is approximately 5 to 1. The consonants t, p, and k are an example of unvoiced sounds, and the vocal chords are not used. These consonants t, p, and k are generated by the interruption of the breath outflow by the action of the lips, tongue, and soft palate which causes a momentarily building up of air pressure. The sudden release of this pent up breath causes the characteristic of sound of the particular consonant.

Other consonants are produced by partially restricting the free flow of air from the mouth. This produces the hissing of sound for the letter s or soft c. These are called sibilants. Other sibilants are the ch, f, h, th, v, and z sounds. Other consonants, such as b, d, and g are formed by the generation of a subdued buzz for these consonants and the interruption of the breath outflow by the action of the lips, tongue, and soft palate which caused a momentary building up of the air pressure and the sudden release which gives the particular characteristic sound. This can be readily seen by making the sounds themselves. It is also noteworthy that a vowel following these sounds of b, d, and g is characterized by a sharp rise in intensity.

The vocal chords are also used with relation to the sibilants so that, for example, an s sound becomes a z sound when the vocal chords are brought into play. Similarly, the f sound produced by the lips becomes a v sound when the buzz of the vocal chords is added. Unvoiced sounds may also be modified by resonant conditions. A study has revealed that the k sound in the word key is higher in pitch than the k sound in "cool," for example. The mind conceives of the words as a unit, and the vowel resonance conditions are already set up at the time the consonant is produced.

In the past, efforts have been made to subdivide the spoken word into phonemes so that once recognized, it could be properly identified as such, and therefore with enough of these phonemes all characteristics of the human language could be readily identified. A study of the results obtained from the present apparatus utilizing this invention indicates that phonemes are idealized subdivisions which are seldomly encountered in practice. The present invention therefore utilizes the word as a basic unit of speech. The significance of this remark can be recognized when the example given above with relation to the k sound is understood.

There are many subtle interactions between sound element or word. These produce transient effects caused by the movement of the organs of speech. When a short word such as "won" is uttered, the lips are pursed for the sound of w and the tongue is low. For the short o sound, the lips spread apart and relax. For the n sound, the tongue is raised to touch the roof of the mouth, and the tongue then relaxes, and the lips close.

Further the sound elements of a word are characterized by duration and intensity. For example, the s and t sounds have similar resonant conditions, but the s sound is longer than the t sound. The s sound is further characterized by slow changes in intensity, but the t sound rises sharply in intensity following the silence of the stop.

Thus the difference between an s and a t sound is a function of duration and intensity rather than frequency.

The fundamental pitch is a factor in voiced sounds. Most men use a pitch in the lower part of their vocal ranges, typically from 110 to 140 cycles per second. Women and children also use the lower part of their vocal ranges, which are an octave higher. The range is usually small for a given speaker, but inflection changes occur which may carry more information than the actual pitch in the English language. In some languages, notably the Chinese language, the actual pitch is a factor, since it may change the meaning of the word.

To summarize, speech sounds are either voiced, unvoiced, or a combination of these. Voiced sounds have the regular buzz of the vocal chords as the carrier, while the unvoiced sounds use a noise source as the carrier, i.e., the hiss of the breath escaping through a narrow constriction. Both carriers are modulated by the adjustment of the size and shape of resonance chambers in the throat and mouth. Speech sounds are further characterized by the duration and intensity of the sound, by the stops preceding explosive sounds, and by changes in the fundamental pitch. In combination, these elements form the word as the basic unit of speech.

It is an object of the present invention to provide apparatus for eliminating redundancy in digital data.

Another object of the present invention is to provide apparatus for monitoring digital data and sampling this data only upon change to generate a compact digital code output.

Still a further object of the present invention is to provide apparatus for monitoring digital data, sampling this data upon change to generate a compact digital code output, and restricting the change for sampling to changes which occur a predetermined minimum resolution time after a preceding change whereby transitory digital data will not be encoded.

A further object of the present invention is to provide apparatus for monitoring digital data and sampling this data only upon change to generate a compact digital code output with the time interval between change included as a part of said digital code output.

Another and further object of the present invention is to provide apparatus for analyzing sound and encoding all significant variables therein.

While it is generally old in the art to analyze the frequency bands contained in a sound waveform to indicate the variables contained therein, the present invention contains improved circuitry to linearize the detected speech bands for more precise monitoring techniques. These frequency band analyzers are adjustable to detect any given band of frequencies.

It is therefore another object of the present invention to provide apparatus for analyzing the frequency band content of a sound waveform with circuitry operative to give a linear output on either side of a given frequency where the frequency bands may be adjusted.

In prior known efforts in analyzing sound and particularly speech, the particularly important variable of sibilant content contained therein has been largely ignored. The present invention has included a circuit particularly adapted to detect sibilants.

It is therefore another and further object of the present invention to provide apparatus for analyzing a sound wave and detecting the presence of sibilants contained therein.

In prior known sound analyzing systems, the intensity of the sound has been encoded at a discrete time as a part of the data sampled. In the present invention, the intensity level of the sound waveform envelope is analyzed continuously and encoded continuously.

Therefore another object of the present invention is to provide apparatus for continuously analyzing a sound wave for intensity variations and continuously encoding these intensity variations.

While the fundamental frequency of speech is relatively fixed for a particular class of speaker, that is, male, female or child, changes in fundamental frequency or inflection are a part of the intelligence contained in the speech waveform.

Another object, therefore, of the present invention is to provide apparatus for analyzing speech for inflection and encoding the same.

It has been found desirable to analyze the manner in which the intensity of the speech waveform goes from one intensity level to another. This is particularly true in the case of certain letters, such as, r and l. Therefore, a circuit has been included in the present invention which samples the smoothness or roughness of the sound waveform as it goes from one intensity level to the next.

Still a further object of the present invention is to provide apparatus for measuring roughness in a sound waveform.

An object of the present invention is to provide apparatus for producing a compact digital code from a complex waveform.

A further object of the present invention is to provide apparatus for analyzing a complex waveform for selected variables, digitizing these variables continuously, monitoring the digital data continuously and generating a digital output only upon change in the digital data.

Another object of the present invention is to provide apparatus for producing a compact digital code from a complex waveform analysis in which the magnitude of the time periods between change points forms a part of the digital code generated.

Another object of the present invention is to provide apparatus for analyzing speech to extract all significant variables therefrom; digitizing these variables continuously, continuously monitoring the digital data and generating a digital output only upon change in the digital data.

By the process of generating a digital output only upon change and by timing the intervals of no change, the unit of information which is the word may be encoded into a series of code representations. The number of columns of representations which must be generated for a particular word will of course vary in dependence upon the length of the word. It is anticipated and subsequent descriptions of the present apparatus will particularize the requirement that a one-syllable word will take approximately 6–12 columns of data, a two-syllable word will take 10–15 columns of data, a three-syllable word will take 12–18 columns of data, etc.

Yet another object of the present invention is to provide apparatus for analyzing sound to extract all significant variables therefrom and digitize the same to generate a compact digital output code formed at two discrete times which occur immediately subsequent to a preceding change in digital data and just prior to an instant change in digital data.

In sampling sound and extracting information therefrom, a substantial amount of information is immediately available for generating a compact digital code. This, for example, is the frequency band analysis which is always available. Other data, such as intensity, inflection, and roughness, are data which is calculated and is delayed by this process to be available at a later time than a frequency band analysis. If the compact code is generated when this last data is available, then the frequency data may change and thus an erroneous code will be generated. By sampling the frequency band subsequent to a change and other variables at the change point, any erroneous generated code will be avoided.

The foregoing and other objects, features and advantages of the invention will be apparent from the following more particular description of a preferred embodiment of the invention, as illustrated in the accompanying drawings.

In the drawings:

FIG. 1 is a schematic illustration of the invention.

FIG. 2, which consists of FIGS. 2a through 2m, is a detailed circuit of the invention.

FIG. 4 is a chart of the waveforms concerned with the summation circuit 56 of FIG. 1.

FIG. 5 is a chart of the waveforms of the inflection detection circuit 91.

FIG. 6 is a chart of waveforms concerning the roughness measure detection circuit 60 of FIG. 1.

FIG. 7 is a chart illustrating how FIGS. 2a–2m are to be arranged to form FIG. 2.

GENERAL SYSTEM

Figure 1:
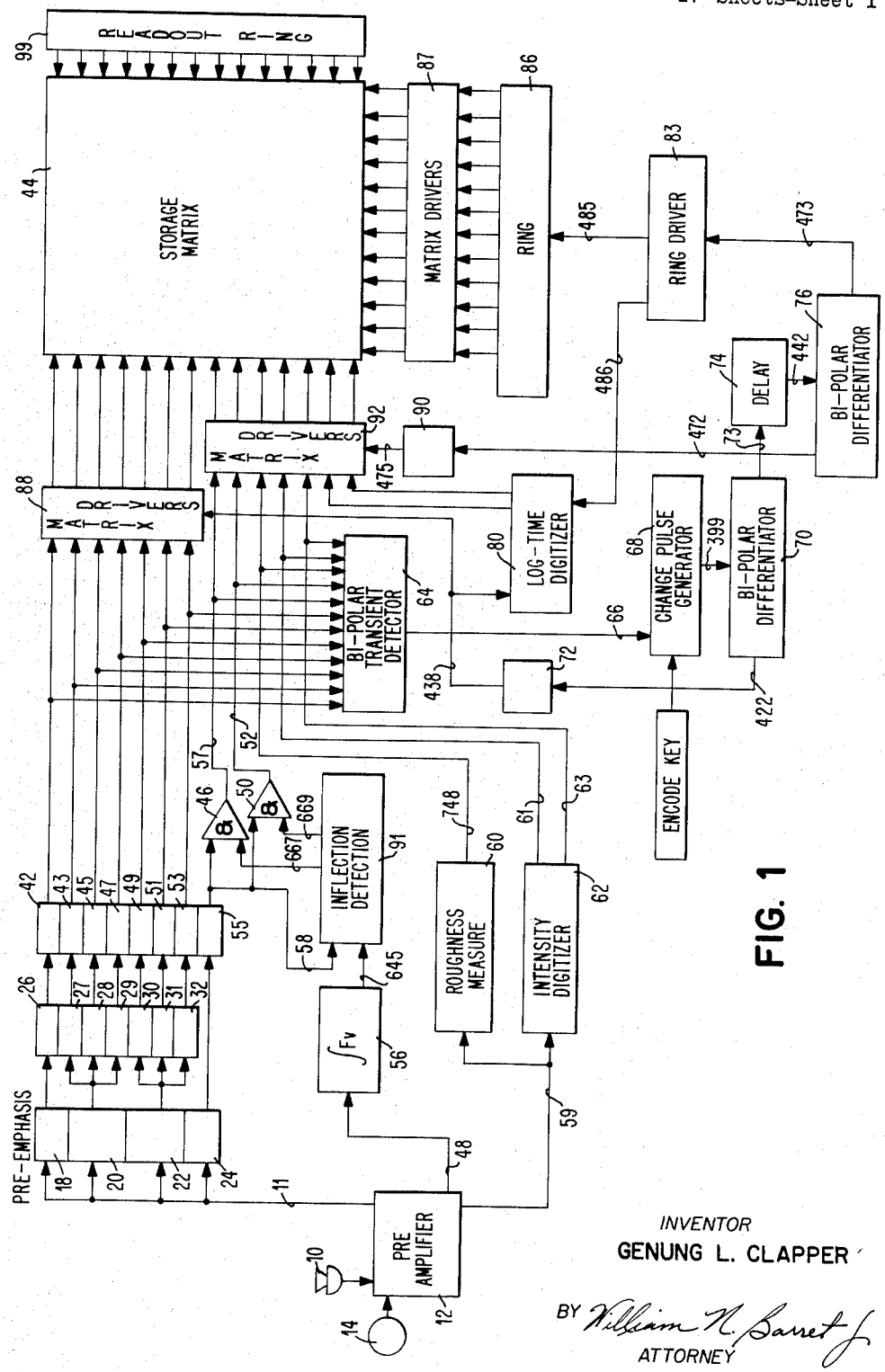

A schematic illustration of the invention is shown in FIG. 1 and will be described before proceeding into the detailed description of the same.

A microphone 10 converts sound waves to electric signals that are amplified by a preamplifier 12. An input sensitivity control 14 is adjustable to reject background noise. The gain is dynamically adjusted to hold the preamplifier output 11 constant.

The uniformly compressed speech envelope 11 from the preamplifier 12 is applied in parallel to three broadband pre-emphasis amplifiers 20, 22, and 24 which emphasize selected broad frequency bands as will be described subsequently as well as to a broadband amplifier 18 which is essentially nondiscriminating as to frequency.

The output of amplifier 18 is applied to a sibilant noise selector 26 which responds only to the high frequency noise components in the speech frequency in generating an output. These noise or high frequency components of the speech waveform are found in the fricative consonants, and the sibilants which it will be remembered are the p, t, k, ch, f, h, th, s, v, and z sounds.

The pre-emphasis amplifier 24 is utilized to amplify the low frequency components of the voice while amplifiers 20 and 22 cover the high and medium frequencies of the voice.

The outputs of the broadband amplifiers 20 and 22 are coupled to frequency selectors 27–32 which each provides an output in the presence of frequencies in a predetermined narrow frequency band to which they are responsive.

Each of these frequency selectors 27–29 and 30–32 has a center frequency which is passed substantially unattenuated. On each side of this center frequency are the symmetrical, higher and lower frequency, components of the band to be recognized. These components are attenuated to a greater degree than the center frequency, but the presence of the same is recognized within limits to be described subsequently. The center frequency is chosen for each band on the basis of the frequency which is most prevalent.

The output of each frequency selector is connected to a series of integrating pulse shapers 42, 43, 45, 47, 49, 51, 53, and 55 which provide a pulse output having two states, a raised output and a lowered output.

The integrating pulse shapers perform the function of recognizing the presence of frequencies determined by the frequency selectors and maintaining an output for a period which is sufficient for the lowest frequency which may be present. Each pulse shaper is set to recognize only those frequencies above a certain amplitude which appear from selectors 26–32. This effectively provides the cutoff point on each side of the center frequency from the selectors. By adjusting the threshold of the integrating pulse shapers, the entire frequency spectrum may be divided into groups of frequency bands.

The output of an integrator circuit is off or down until the input has reached a required amplitude for a certain minimum of time. When the input has reached this required amplitude, the output of the integrator 42 will stay on until the input has fallen below the threshold value level for a time. The output of each integrator is therefore a series of square waves which denote the presence or absence of a particular frequency band in the speech waveform. The output of the integrators 42, 43, 45, 47, 49, 51, 53, and 55 determines the frequency data information to be entered into a storage matrix 44. The output of the integrator 55 is not directly entered into the matrix 44 but controls the operation of inflection detection circuits 46 and 50.

An output 48 from preamplifier 12 carries a signal at the fundamental voice frequency. This signal at the fundamental voice frequency is applied to an integrator circuit 56 which provides a D.C. output 645 indicative of the fundamental voice frequency. The D.C. voltage on output 645 is supplied to an inflection detection circuit 91.

The inflection detection circuit 91 provides an output indicative of the slope of the integrator output 56. For purposes of coding, a steady pitch with a zero slope produces a raised output "1" on lines 57 and 52. A rising pitch results in a change in the output 52 from a raised output "1" to a lowered output "0," which leaves the output 57 at "1." A falling pitch changes output 57 from "1" to "0" and leaves output 52 at "1." No voice keeps both up outputs at "1." A voice interlock on line 58 controls the outputs 57 and 52 by means of AND circuits 46 and 50 to prevent an output in the absence of voice.

A roughness measure circuit 60 is designed to inspect the AGV voltage for sharp change in the AGC waveform that indicates a rapid fluctuation of the speech wave intensity. It is further designed to ignore single short explosive bursts, but will respond to a series of short bursts provided they are at a high enough repetition rate. This measure provides information about some difficult sounds, such as the r sound or the l sound. The output of the roughness measure circuit is applied directly through the matrix driver 92 to the matrix 44.

An intensity digitizer 62 produces a binary indication 61 and 63 of the absolute intensity of the speech waveform as a function of the AGC voltage level 59. These outputs are connected to the matrix driver 92.

Up to this point in the description, the voice has been analyzed, and the variables contained therein represented by digital data. This data is applied to matrix drivers 88 and 92 which are gated at the proper time to sample the data to generate a compact digital code.

This sampling process is initiated by a change in the dgital data detected y a transient detector 64. As will be noted, the input of the transient detector is connected to the output of each of the analyzing means used for the voice. As any of the outputs of the integrating shapers 42, 43, 45, 47, 49, 51, and 53 rise or fall indicating a change in frequency band content, the transient detector 64 will generate an output pulse. In a similar manner if inflection changes as determined by the circuit 91, or if the roughness output 48 changes, or if the intensity output 61 and 63 changes, the transient detector will generate an output pulse.

The output pulse from transient detector 64 on line 66 initiates a change pulse generator circuit to generate a change pulse. This change pulse is of the positive-going type and therefore will exhibit initially a positive-going excursion and terminally a negative-going excursion.

On the positive excursion of this pulse on line 399, the differentiator 70 will generate a pulse on line 73 to a delay unit 74 which generates a pulse having a predetermined width. A differentiator 76 detects the initial and terminal portion of this pulse to generate an output at 472 and subsequently at 473. The output at 472 is substantially coincident in time with the beginning of the change pulse at output 399.

The pulse output at 472 is applied to a sample pulse generator 90 which generates a pulse on line 475 to gate matrix driver 92. As noted previously, the digital data supplied to matrix driver 92 is inflection, roughness and intensity. It will now be noted that a fourth variable is also supplied to driver 92 time. A time digitizer 80, measuring time on a log base, continuously indicates the elapsed time from the preceding change.

Upon termination of the short delay pulse from unit 74, 300 μs., an output pulse will be generated by differentiator 76 on line 473. This pulse on line 473 is coupled to a ring drive pulse generator 83 which furnishes pulse on lines 485 and 486. The pulse on line 486 is used to stop the digitizer 80 from counting time and reset the same to zero time indication. The pulse on line 485 operates a ring 86 which advances through successive ON stages. Each ON stage operates through a matrix driver 87 to condition a column of storage elements in a matrix 44.

The preceding description concerns itself with the beginning of the change pulse on line 399. At the end of the change pulse, the differentiator 70 generates a pulse on line 422 which is connected to a sample pulse generator 72. Sample pulse generator 72 generates a pulse and applies the same by a line 438 to the digitizer 80 and the matrix driver 88. The digitizer 80 is started and now begins to mark time while the frequency band information is gated to matrix 44. It should be here noted particularly that the frequency band information has not been entered into the same colum as the information previously gated by driver 92 but is entered into the column of storage 44 next energized or conditioned by ring 86. On the next change pulse which is generated, the information applied to driver 92 is entered into the same column as the frequency band information just mentioned.

The rationale for entering information into a single column at two sample times is that the frequency band data is instantly available and must be entered immediately subsequent to a change so that no errors will arise caused by rapidly changing frequency band information at the moment of change. On the other hand, the information furnished to driver 92 is calculated and changes move slowly so that there will be sufficient time to sample at the initiation of change point without introducing error through changing variables at the time.

Thus there are two sample times, one immediately following a change and one coincident with the next change, and this data is grouped together to form one coded output. It should be particularly noted that data sampled coincident with change and after change are not grouped together since there has been a change.

The length of the change pulse is set in accordance with the resolution necessary in the data being monitored. In this case, the hearing of a human is not capable of detecting data which occurs much less than 20 ms. apart, and thus if there are a number of changes spaced closer together in time than 20 ms., the data at each portion conveys no intelligence. These data indications brought about by changes are accidental, it would appear, as the voice goes from one stable condition to another.

While the hearing does not appear to be able to detect data presented closer together in time than 20 ms., the pulse generator 68 of FIG. 1 has been set to generate a pulse of approximately 12.5 ms. This is empirical and appears to give the best results. Thus when a change is detected by transient detector 64, a pulse of 12.5 ms. is generated by generator 68. During this interval of time, if another change is detected by transient detector 64, the pulse from generator is lengthened, and sampling is not performed until the data has remained constant for an extended period of time, which will be approximately 12.5 ms. after the beginning of this pulse from transient detector 64.

If the phenomenon being examined is other than voice, this change pulse would be set to approximate the resolution necessary for accuracy.

In summary therefore, a system for analyzing speech has been disclosed in which the speech is analyzed for:

(1) frequency band content
(2) voice inflection
(3) roughness
(4) intensity
(5) duration of no change and wherein the information is stored only upon change.

Further the frequency band content of the speech is stored in a storage matrix at the beginning of a no-change period while inflection, roughness, intensity and time of no change are stored upon the termination of the no-change period and before the matrix column is shifted so that all elements pertaining to one sound are coded in the same column.

So that the general operation of the invention will be understood, a particular example will now be given using the end of the word "light." This combination gives an example of the ending of the i sound, a stop and the t sound.

Figure 3:
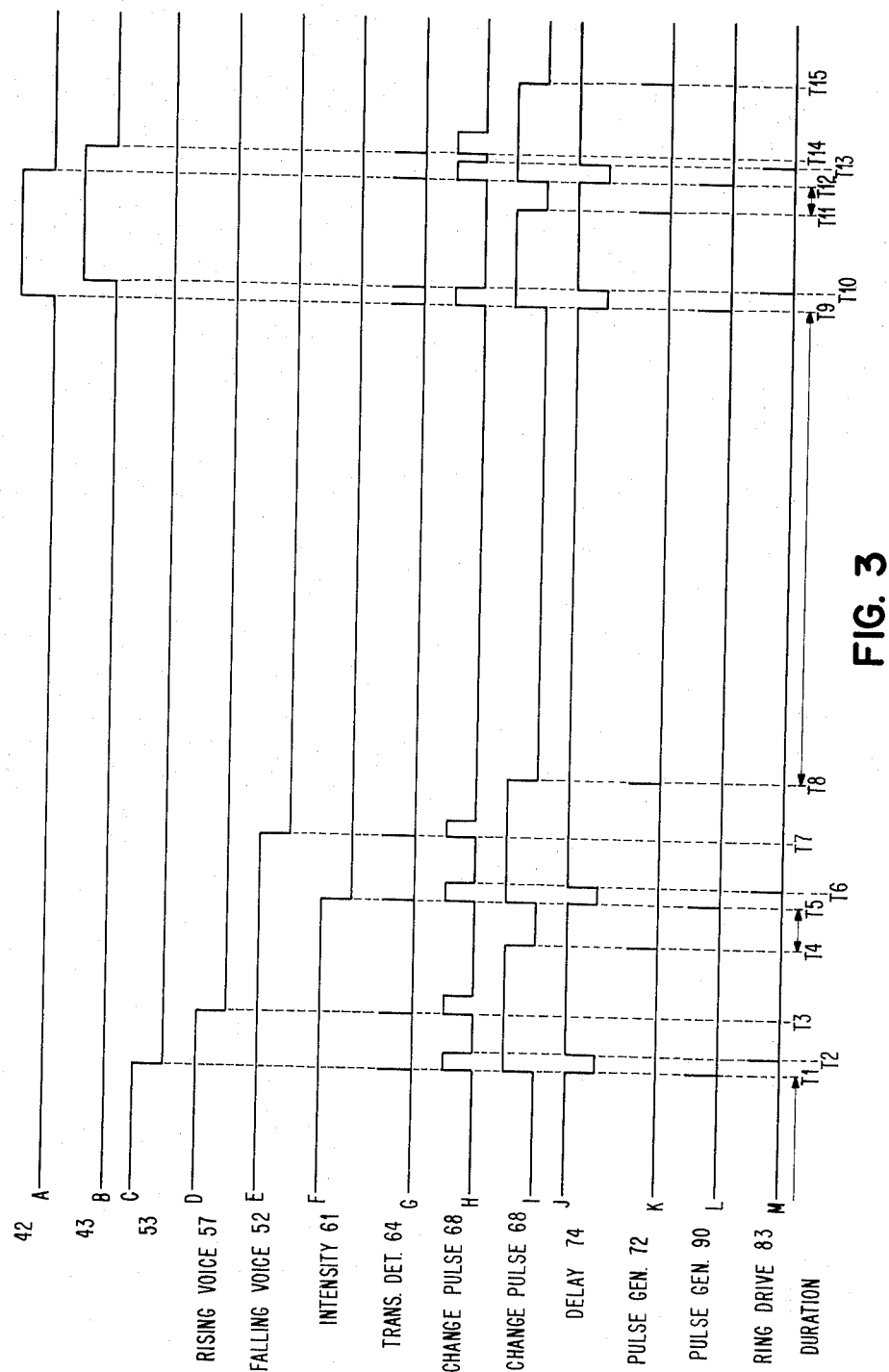
FIG. 3 is a timing chart of the general overall operation of the invention.

Referring particularly to FIG. 3, the chart illustrates the variables, lines A–F, and the control circuit operation, lines G–M. FIG. 1 should be used in combination with FIGS. 3. Only those variables which change are shown. Other variables are in the off or down condition and are not shown for this illustration.

The first change in the example is the termination of the output from shaper 53, line C, caused by lack of frequency content in this band. This information would have already been entered into matrix 44. The negative transient at the output of the shaper 53 is detected by the transient detector 64 and supplies a positive pulse to change pulse generator 68, see line G. The change pulse generator 68 produces internally a short pulse line H, and externally a pulse, line I, which is at an up level so long as change pulses, line H, are continuously generated within a predetermined time interval. The output pulse on line I from generator 68 starts about 1 millisecond after the first pulse on line G.

This positive transient, time $T_1$, line I, is coupled to delay unit 74 which generates a negative-going pulse, line J. The negative transient of this pulse is applied to sample pulse generator 90 by differentiator 76. The sample pulse generator 90, line L, gates information appearing at its input into matrix 44. This information at time $T_1$ is as follows:

(a) Rising voice line 57 up, line D⎫ indicating that
(b) Falling voice line 52 up, line E⎭ voice is steady (c) Intensity 63-up, 6–12 db
(d) Frequency band (53)
(e) Duration, up to time $T_1$ After 300 microseconds, the negative pulse from delay 74, line J, turns OFF, and the positive transient is sensed by differentiator 76. The output of differentiator 76 activates the ring drive pulse generator 83 which delivers a pulse, line M, to step the storage matrix 44 so that the next successive column of storage elements is conditioned to accept the next successive set of data. The output of pulse generator 83 is also used to turn off the time digitizer 80.

The next change occurs when the rising voice line 57, line D, drops, indicating a falling voice fundamental pitch change. A pulse generated by the transient detector 64 initiates a second change pulse, time $T_3$, line H, before the change pulse, line I, from change pulse generator 68 has terminated, thus extending the time of the change pulse. When the change pulse, line I, terminates at $T_4$, the negative transient from generator 68 generates a sample pulse, line K, to sample the frequency bands by gating matrix driver 88. Further, this same pulse initiates the log time digitizer 80 to measure the time to the next change. There are no frequency bands present at time $T_4$, so that no frequency information is now entered into the storage matrix 44.

At time $T_5$, the intensity level, line F, drops and a new change pulse is formed and samples the following by matrix drive 92:

(a) Falling voice, line E
(b) Intensity, 0–6 db
(c) Duration, $T_5$–$T_4$

After the delay interval, the ring 86 again advances at time $T_6$.

During the change pulse, line I, the falling voice variable, line E, drops, which lengthens the change pulse. At the end of the change pulse, $T_8$, line I, the matrix driver 88 again samples the frequency information. Here again there are no frequency bands present. The timer 80 is turned on and marks the duration of the "stop" which is sampled at time $T_9$.

At time $T_9$, the frequency band 42, line A, turns ON, and at time $T_{10}$, the frequency band 43, line B, turns ON. Both of these pulses cause outputs from the transient detector 64, but these occur within the pulse time, line H, which is not an integrator output as is the case of the change pulse from generator 68. The change pulse, line I, which begins at time $T_9$ is thus the normal length as determined by the desired minimum resolution. During this change pulse, the ring 86 is advanced, line M, so that at time $T_{11}$, both frequency bands 42 and 43, lines A and B, were sampled by matrix driver 88.

When frequency band 42, line A, goes off, the variables controlled by driver 92 are sampled and the ring 86 advanced. Here the time would be $T_{12}$–$T_{11}$.

When frequency band 43, line B, turns off, the pulse, line H, integrates to extend the change pulse, line I. At the termination of this pulse, line I, at time $T_{15}$, the termination of the word is noted, and the word code is complete.

DETAILED DESCRIPTION

Figure 2A:
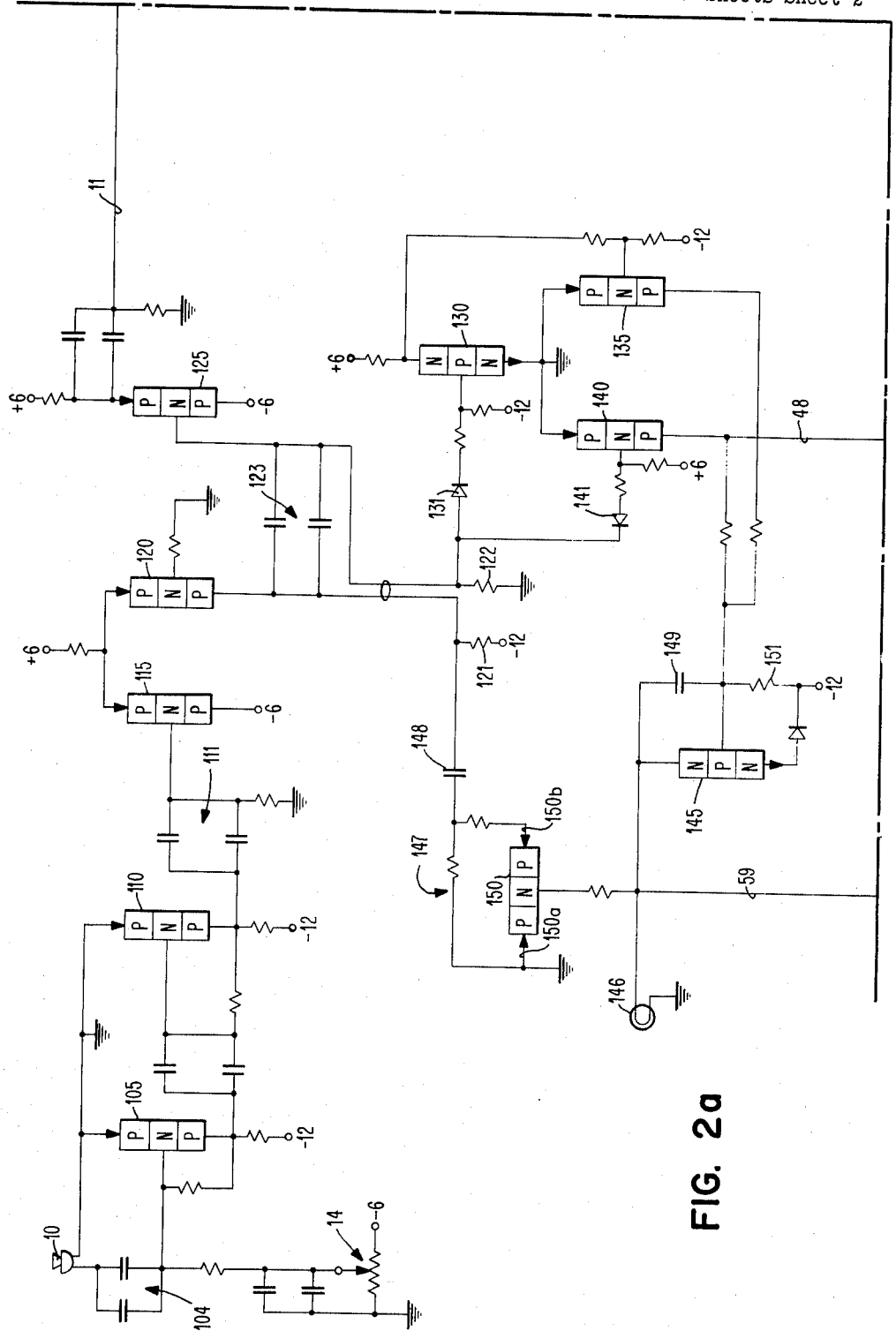

Pre-amplifier (FIG. 2a)

In the compression of speech and audio waveforms, there are generally several requirements involved. One of these is that the compression attack be as fast as possible without too much overshoot and the other is that the response after compression be fast to enable the indication of the weaker speech sounds. Also a definite level of over-all sensitivity must be established to prevent noise amplification in periods of silence. This is often not done in regular public address equipment, the compression usually being rather slow which tends to average out the volume, and it is possible to have considerable delays both in the attack and recovery without serious problems. However, in speech analysis equipment there is needed both a fast attack and recovery and furthermore it is desired that no appreciable distortion be introduced since a frequency analysis is made of the speech waveform and any clipping or other distortion would introduce frequencies which would upset any frequency analysis or speech recognition code that might be used. Former methods of compression have utilized a gain control operating upon the first or second stages of a preamplifier. Although this method is efficient, the operation is usually somewhat slow because of unavoidable delays produced by the relatively long time constants of the coupling networks.

Referring to FIG. 2a, a dynamic microphone 10 is shown feeding through input capacitors 104 to a preamplifier circuit which comprises two transistors 105 and 110. These stages are conventional capacitor-coupled grounded emitter stages operating in class A amplification with a high degree of degenerative feedback in each stage. Input sensitivity is controlled by changing the gain of transistor 105 through a change in its operating point by means of a manually controlled potentiometer 14.

A preamplifier output at the collector of transistor 110 is reflected through capacitors 111 to the base of a transistor 115. Transistor 115, along with a transistor 120, cooperates to form a voltage amplifier having inherent compression properties. Transistor 115 operates to control the current flowing in the emitter of transistor 120 and transistor 120 operates as a grounded base voltage amplifier.

The signal appearing at the base of transistor 115 is A.C. and the swing in the range of tenths of a volt. In the no-signal condition, both transistors 115 and 120 are biased at approximately the same voltage and equal currents will flow in both. When conductivity is decreased or increased in transistor 115 by virtue of the A.C. signal, the change in current flow through transistor 115 will effect the transistor 120 in the inverse manner since these transistors form a parallel circuit.

The voltage at the collector of 120 will vary in the same manner as the input signal at the base of transistor 115. A resistor 121 having a value of 2,000 ohms has connected in parallel thereto a capacitor 148 for reflecting these A.C. voltage changes to a circuit 147.

Also connected by capacitors 123 to the collector of transistor 120 is a network of A.C. signal sensing transistors 130, 135, and 140. Transistor 130 and transistor 140 are connected by diodes 131 and 141 to the capacitors 123, and these transistors are normally biased near conduction when no A.C. signal is applied across capacitors 123.

When a positive change is sensed at the collector of transistor 120, the diode 131 couples the same to transistor 130 and causes conduction. When transistor 130 conducts, the collector drops toward ground potential, and the transistor 135, normally biased off, conducts and raises the potential at its collector.

In a similar manner, negative changes at the collector of transistor 120 cause conduction in transistor 140 which also generates a positive voltage signal at its output.

These positive pulses from transistors 135 and 140 indicative of positive and negative swings of voltage at the collector of transistor 120 are coupled to an integrator circuit 145, 146, 149, and 151. As these positive pulses cause conduction in transistor 145 and establish a given voltage at the collector thereof, the capacitor 149 will by contributing and accepting current at the base tend to keep the transistor 145 at a steady conducting state so that peaks of voltage from transistor 140 and 135 will not affect the operation. This is a Miller type integrator.

An incandescent lamp 146 connected to the collector of transistor 145 acts as a resistance integrator in that pulses of random nature which may cause conduction in transistor 145 will not cause a voltage drop across lamp 146, and thus the voltage at the collector of transistor 145 will stay at ground potential.

When the signal at the collector of transistor 120 increases in amplitude other than for short peaks, the voltage at the collector of transistor 145 will drop to some value less than ground potential.

A bilateral transistor 150, i.e., having two emitters, is normally maintained in a given state of conductivity by the potential applied to the base thereof by the lamp 146. When there is no integrating action of integrator 145 and the base is at ground potential, transistor 150 is nonconducting and thus presents a high impedance to any signal applied to capacitor 148. Thus for a no-change signal condition at the base of collector 120, the circuit 147 is a high impedance.

For signal conditions which vary positively and cause integration by the integrator 145, the transistor 150 is biased more conducting, the increased current through transistor 120 sees a lower impedance through capacitor 148 which prevents the voltage at collector 120 from rising. In this the emitter of transistor 150 which is used is 150b.

For negative type signal excursions the same result occurs but here the emitter is 150a, and the circuit 147 transfers current through capacitor 148 to raise the voltage output.

The output of transistor 145 is the AGC voltage and governs the conduction of a bilateral transistor 150 which reflects an impedance to the preamplifier output stage 120 which is an inverse function of the AGC voltage. The preamplifier gain of the transistor 120 is variable as a function of the load. Therefore, by changing the effective impedance of the amplifier 120, the output gain of the transistor 120 may be varied and the input speech frequency may be compressed into the uniform envelope.

Increased compression voltage results in increased conduction and lower impedance which lowers the gain of the last stage 120 so controlling the output amplitude without excessive distortion. The result is to speed up the compression action without introducing oscillations or distortion. Thus a relatively constant amplitude signal appears at the base of a PNP transistor 120 which drives an output stage 125.

The output 48 is indicative of the fundamental frequency of the sawtooth contained in the voice.

This circuit is described and claimed particularly in application Serial No. 161,088 to Genung L. Clapper.

*Pre-emphasis amplifiers (FIG. 2d)*

The output 11 of the amplifier 12 is applied to the pre-emphasis amplifiers shown as 18, 20, 22, and 24.

The amplifier 18, labeled sibilant selector driver, is a current amplifier, capacity coupled to the input line 11 by a capacitor 201 and by means of a potentiometer 202 connected to a transistor 205. Variations in the input signal are coupled from the emitter of transistor 205 to an output 207. The sibilant selector driver 18 is a broadband amplifier and amplifies all input frequencies applied thereto.

The pre-emphasis amplifier shown at 20, as well as amplifiers 22 and 24, is also connected to the input signal line 11. Variations in the input signal cause variations in amplitude of the output taken at the emitter of emitter follower transistor 210 through a potentiometer 211 and reflected across the capacitor C1 to the resistor-capacitor network consisting of resistors and capacitor C2. The capacitors are tuned for a particular range of frequencies. Thus each amplifier 20, 22, and 24 emphasizes a particular broad portion of the voice frequency band. The capacitors C1, C2 and C3 vary for each amplifier as follows:

| Range | C | C2 | C3 | Frequency, cps. |
|---|---|---|---|---|
| High | .02 | .001 | 5.0 | 900–4,500 |
| Medium | .12 | .004 | 10.0 | 200–1,000 |
| Low (voice) | 1.5 | .01 | 50.0 | 70–350 |

*Band selector amplifier (FIG. 2d)*

The outputs of the amplifiers 18, 20, and 22 are connected to band selectors 26, 27, 28, 29, 30, 31, and 32 for the selection and amplification of various frequencies.

*Sibilant noise selector (FIG. 2d)*

The output of the sibilant selector driver 18 is connected to a sibilant noise selector 26 which is a difference amplifier consisting of transistors 251 and 253. The input 207 from the driver 18 is connected to the base of transistor 251. The output of transistor 251, from its emitter, is connected to the emitter of transistor 253. Variations in the output of transistor 251 will thereby control the conductivity of transistor 253 by control of the emitter current from the source by transistor 251 but inversely thereto. Input 207 is also connected to the base of transistor 253 so that the output 255 at the collector of transistor 253 will be the difference between the inverse of the signal received at the base of 251 and the signal at the base of 253. A low pass filter circuit 257, consisting of an inductance 256 and a capacitor 258, is connected in the input circuit of the transistor 253. This low pass filter circuit insures that only the low frequencies from the sibilant selector driver 18 will be connected to the transistor 253, while the unfiltered signal from driver 18 will be connected to the transistor 251. The difference between the signals applied to each transistor will be the high frequencies so that the output on line 255 will be the high frequency noise content or sibilants.

A feature of importance in this circuit is the fact that the filter circuit 257 introduces a delay in the input to the transistor 253. It has been found that the effect of this delay introduced into this line enhances the amplification which would ordinarily be expected from a simple difference amplifier. Unexpected results which were achieved were in the more highly amplified signal. What has been provided therefore is a broadband filter with extremely good high frequency response and sharp attenuation of all frequencies below 4,000 cycles for selecting the high frequency noise content from the complex speech waveform.

This was very important since when active filter circuits were tried which were sensitive and broad enough to pick out the weak and diffuse frequency spectrum of the *f* and *v* sounds, these normal filters were liable to produce false responses to high vowel resonances which are quite strong up to nearly 4,000 cycles. The output 255 of the sibilant noise selector is coupled to a biased integrating shaper 42.

*Integrating shaper (FIG. 2d)*

This circuit is an important feature of the present invention and is disclosed and claimed particularly in an application filed in the name of Genung L. Clapper, Serial No. 161,181, which is now U.S. Patent No. 3,098,939, issued July 23, 1963 (docket 6352–IBM).

Integrator circuits ordinarily produce poorly shaped output pulses that must be shaped up with additional circuitry. In addition, it has been found that most integrator circuits operate with uncertainties as they pass a threshold point. They tend to jitter in response to a series of changing pulses, and they generally produce an output waveform having a sawtooth or ramp function. In integrating the output of an audio amplifier, for example, to indicate the presence of a packet of pulses at a given frequency and then presenting the integrated output to a transient detection scheme for the purpose of detecting only meaningful changes in the audio output, it was found to be not only desirable but necessary to provide an integrator circuit that produced output waveforms which are square and well shaped with fast leading and falling edges.

The present integrating shaper takes the form of an integrator circuit having a degenerative feedback which is used during integration and a regenerative feedback which comes into play at the proper time to shape the output pulse. The first pulses of a series are integrated, and a transistor 279 is switched into conduction. Integration continues as a degenerative feedback path through capacitor 276 is provided and when a threshold is reached, a second transistor 280 is switched into conduction. A regenerative feedback through capacitor 278 from the output of the second transistor overrides the degenerative feedback and both transistors 279 and 280 are driven into solid conduction. When the input pulses cease, the second transistor 280 is switched out of conduction and the regenerative feedback through capacitor 278 again overrides the degenerative feedback and both transistors are driven to cutoff, and there is produced a good square output pulse.

The output of the noise selector 26, 255, is shown connected by way of a capacitor 283 and input diode 275 to the base electrode of an NPN type transistor 279. A network 284 is provided to adjust the D.C. level of the signal. Transistor 279 is a current operated voltage amplifier and inverter and has an emitter electrode connected to a negative 6 volt terminal and a collector electrode connected through a resistor to a positive 6 volt terminal. A negative 12 volt terminal provides bias voltage to the base through a resistor 285.

The collector output of transistor 279 is applied through a resistor 286 to the base electrode of a PNP type transistor 280. Transistor 280 is also a current operated voltage amplifier and inverter and has an emitter electrode connected to a source of ground potential and a collector electrode connected by way of resistor 277 to a negative 12 volt terminal.

A pair of capacitors 276 and 278 are provided which together control the input resolution and the minimum output pulse width. Although not necessary, it has been found that the best results are obtained when the capacitors are equal in value. Capacitor 276 is connected to provide a degenerative feedback path from the collector to the base 12 of transistor 279, and the capacitor 278 is connected to provide a regenerative feedback path from collector of transistor 280 to the base of transistor 279. As will be seen, the degenerative feedback loop makes the decision to flip the circuit and put out a binary indication and will effect integration throughout the time that the circuit is in a quiescent state between decisions. However, every time a decision is made and the circuit changes, the regenerative feedback loop comes into play to momentarily over-ride the degenerative loop and shape the edge of the pulse.

With no input applied on line 255 in the form of a sine wave, the potential at the base of transistor 279 is at a negative voltage between −12 volts and −6 volts as determined by potentiometer 260, and the potential at the collector of transistor 279 is at positive 6 volts and accordingly, both transistors 279 and 280 are cut off, and the output is at negative 12 volts. The presence of a signal on line 255 will render the input diode 275 conductive, and current will flow from the input through the diode to the capacitor 276 and the base, and the potential at base will rise. The potential at the collector circuit of transistor 279 will be bumped up as current flows into the +6 volt terminal through capacitor 276. Current flow through the bias resistor 285 will be negligible and may be disregarded. The first changes will be integrated, and the voltage at the input of diode 275 and the base of 279 will rise until the negative 6 volt emitter bias is overcome and transistor 279 will go into conduction.

With transistor 279 in conduction, the potential at collector 279 drops, and collector current is fed in the degenerative path back to capacitor 276. This collector current restricts or cancels out the input current supplied to the capacitor, and there is left only a small amount of current flowing into the base. As a result, the current gain between the collector and base of transistor 279 is made very low, and it approaches unity. Integration now continues as in a Miller integrator as capacitor 276 provides the degenerative feedback path. When a sufficient number of sine wave excursions come in to integrate to a point where the potential at collector of 279 drops below a threshold condition, which in the circuit shown is ground, transistor 280 goes into conduction, and its collector output rises. This rising transient is reflected back through capacitor 278 to the integrating point and will actually overpower it. The circuit mode now becomes regenerative instead of degenerative, and the rise at the output of transistor 280 will overcome any tendency of the drop at the input of transistor 279 to lower the base voltage.

Thinking in terms of current, the gain of transistor 280 has not been altered, and hence the current gain between the collector and base may be anywhere between 50 and 150. This allows transistor 280 to maintain control of the circuit. The current in the regenerative feedback will be greater than the current that flows in the degenerative feedback, and transistor 279 is turned more on resulting in an increased drop of potential at collector of 279 which turns transistor 280 on harder. The action is regenerative. Therefore, at the time that the circuit makes a decision to produce an output, it goes into a strong regenerative operation, much like a single shot, to drive both transistors into solid conduction and to produce a sharp output pulse.

During the train of input pulses, the degenerative feedback path through capacitor 276 will reflect the positive rise in potential which will occur at collector of 279 in between occurrence of the input pulses to keep the transistor 279 from turning off. This keeps transistor 279 in conduction, and the output remains at 0 volt.

It is interesting to note that as soon as the threshold point is passed and the front end of the pulse has been established, the circuit immediately switches back to the degenerative mode because current will have ceased to flow in the regenerative feedback. Now any change at the collector of 279 will be fed back degeneratively and integration is resumed. In effect, then, the circuit automatically switches from integration to pulse shaping and then right back to integration so that integration is carried out practically all the time except for the time that a decision is being made. Returning back to integration allows the circuit to faithfully turn off at the time it should, which is sometime after the input has ceased or becomes weaker in amplitude.

When the input ceases, the potential at collector of 279 rises until transistor 280 cuts off. At this point, the output drops sharply, and this transient is passed by capacitor 278 to again override the degenerative feedback, with the result that both transistors are strongly driven to cutoff to produce a sharp drop in the output pulse. If desired, and as shown, the shape of the pulse may be changed by connecting a suitable resistor between the base electrode of transistor 279 and capacitor 278 to limit the amount of current that will flow in the regenerative feedback loop. This resistor also limits the current flow to capacitor 278 during input integrations.

Isolated pulses or noise will not produce an output, and input pulses meeting minimum resolution requirements will be integrated and a shaped output produced.

The output of the integrating shaper on line 287 is connected to the AND circuit and particularly AND circuit 301.

*Band selectors (FIG. 2d)*

The output from the pre-emphasis amplifiers 20, 22, and 24 are connected to a frequency selective amplifier, such as 27. The frequency selective amplifier is an amplifier circuit which will respond only to a single narrow band of frequency. The present frequency select amplifier is shown and claimed particularly in application Serial No. 161,090 to Genung L. Clapper (docket 6357, IBM). In general all frequency selective systems have employed inverse feedback or degenerative circuits for producing an output having certain characteristic features. The use of these amplifiers does not produce altogether satisfactory results due to the fact that such circuits have a logarithmic characteristic, and hence the output of the circuit is not as linear and sharp as it could be. The present circuit obviates the shortcomings by providing a frequency selective transistor circuit employing a parallel T network and providing a feedback arrangement between the parallel T network and the input stage whereby the output characteristic of the circuit is linearized. In general, the arrangement is such that a first transistor 303 amplifies the input signal appearing at the base thereof and applies it to a parallel T circuit consisting of components generally shown at 305 to 310. The output of the parallel T filter circuit is applied to a second transistor 304 which amplifies the feedback signal from the filter network and controls the characteristic of the transistor 303 through the collector-emitter connection. The frequency selector amplifier 27 is the same as that shown for the remainder of the amplifiers and the chart below illustrates the values of the capacitors and the resistances used to give a center band width around the $f_o$ frequency indicated in this chart.

| Amp. | $f_o$ | C-305, 306 | C-310 | C-311 | R-312 | Range |
|---|---|---|---|---|---|---|
| 27 | 3,600 | .0047 | .0094 | .025 | 62Ω | 2,700–4,500 |
| 28 | 2,160 | .008 | .016 | .04 | 62Ω | 1,620–2,700 |
| 29 | 1,296 | .0135 | .027 | .068 | 62Ω | 972–1,620 |
| 30 | 810 | .0215 | .043 | .1 | 39Ω | 648–972 |
| 31 | 540 | .033 | .066 | .15 | 39Ω | 432–648 |
| 32 | 360 | .047 | .094 | .25 | 39Ω | 288–432 |

For a frequency $f_o$ as indicated above, the emitter of the transistor 303 is substantially at ground potential and acts as a grounded emitter amplifier. The emitter is returned through a resistor to the +6 volts so that the input transistor will operate as a class A amplifier and never cut off, thereby avoiding undesirable clipping effects. At this frequency, the input signal is amplified and inverted. Since the parallel T network will not pass a signal in this range, the control transistor 304 is in a nonconductive state, and a maximum output of 6 volts is obtained on line 313.

As the signal at the input varies from the $f_o$ frequency given for a particular frequency selective amplifier, the parallel T network will not attenuate these frequencies as much as those frequencies near the $f_o$ frequency, and the signal will be fed to the transistor 304. The transistor 304 goes into conduction, and the feedback signal from the parallel T network is amplified and inverted and applied to the emitter of the transistor 303 in a degenerative manner. The signal appearing at the emitter of transistor 303 is substantially equivalent to the input signal at the input to the base of transistor 303, and the gain of the input transistor is accordingly reduced well below unity for all frequencies other than the $f_o$ frequency. There is thus produced a bandpass action which is narrow. In summary therefore, the input transistor 303 is shunted by the transistor 304, whereby the normal logarithmic tendency is changed to a linear one because the shunt control has an antilog tendency which is the reverse of the logarithmic tendency. The summation of the logarithmic and antilogarithmic tendencies produces the desired linear frequency characteristic.

The output 313 of the selective frequency amplifier 27 is applied through the threshold adjusting clipper and to the integrating shaper which is the same as 42 discussed previously in relation to the sibilant noise selector. Each of the remaining frequency bands indicated above has a corresponding circuit to that described in relation to amplifier 27. The voice band which is the low frequency band is applied through a 0.5 mfd. capacitor 315 to a biased integrating shaper 55 without utilizing the frequency selective amplifier discussed in relation to the first intermediate bands.

Summarizing, there has been described the preamplifier and automatic gain control whereby the voice is amplified and compressed into a uniform amplitude and applied to a series of pre-emphasis amplifiers. The output of these amplifiers is in turn applied to a series of band selector amplifiers to produce an output when selected frequencies are present in the input. These frequencies are applied in turn to integrating shapers which will generate an output pulse which will vary in width dependent upon the continuance of the preselected input frequencies.

Figure 2B:
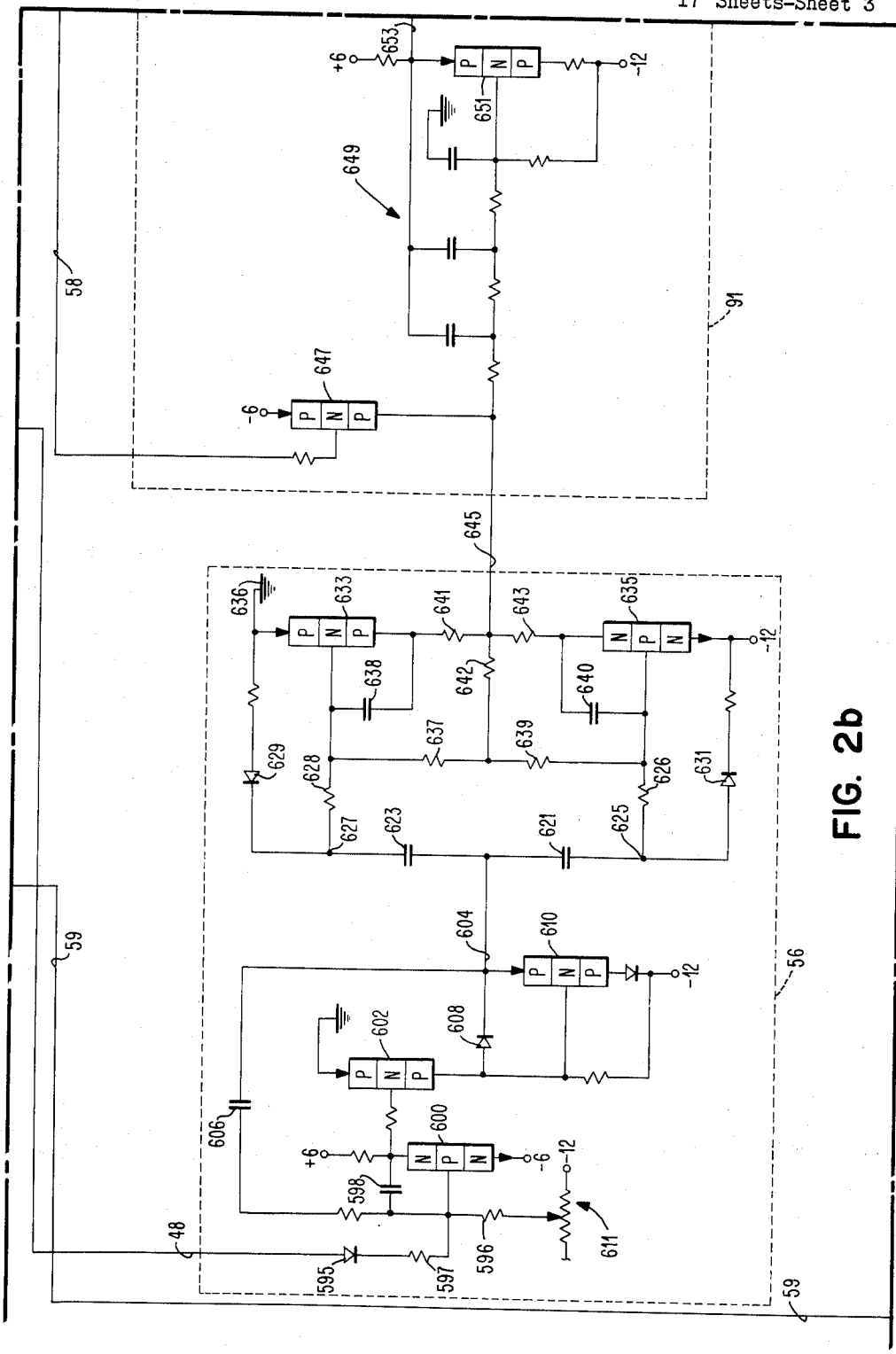
Figure 2C:
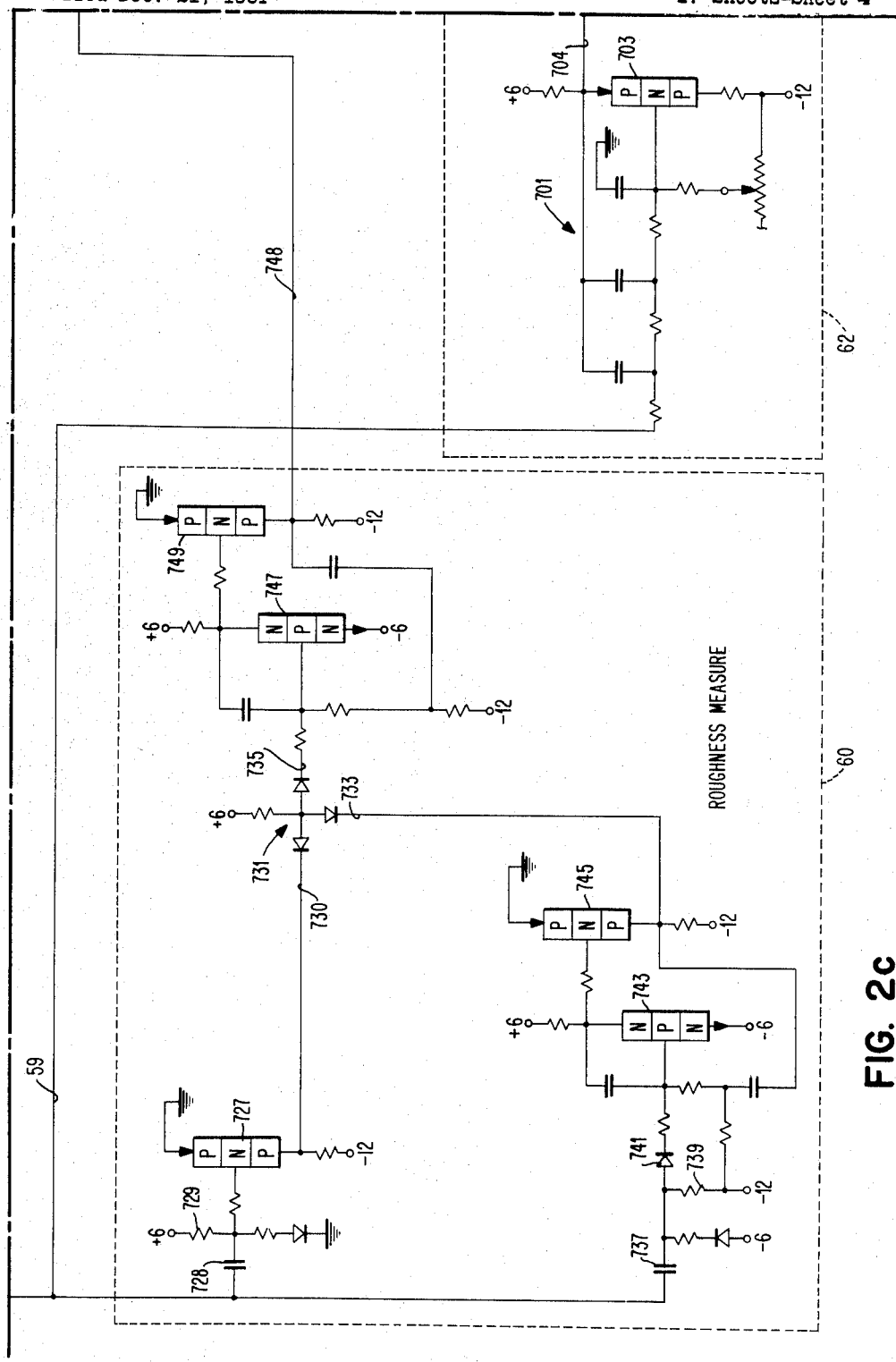
Figure 2E:
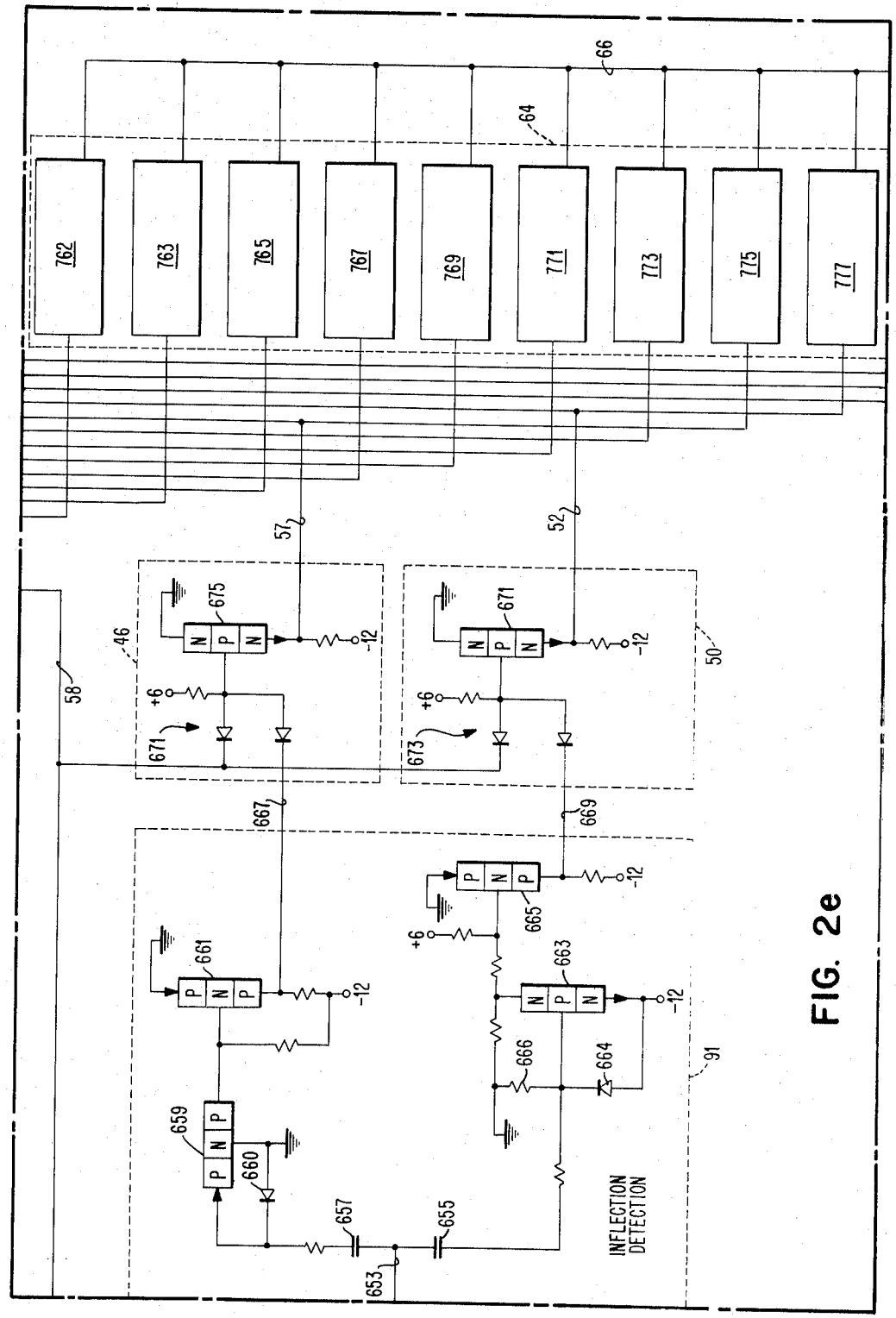
Figure 2F:
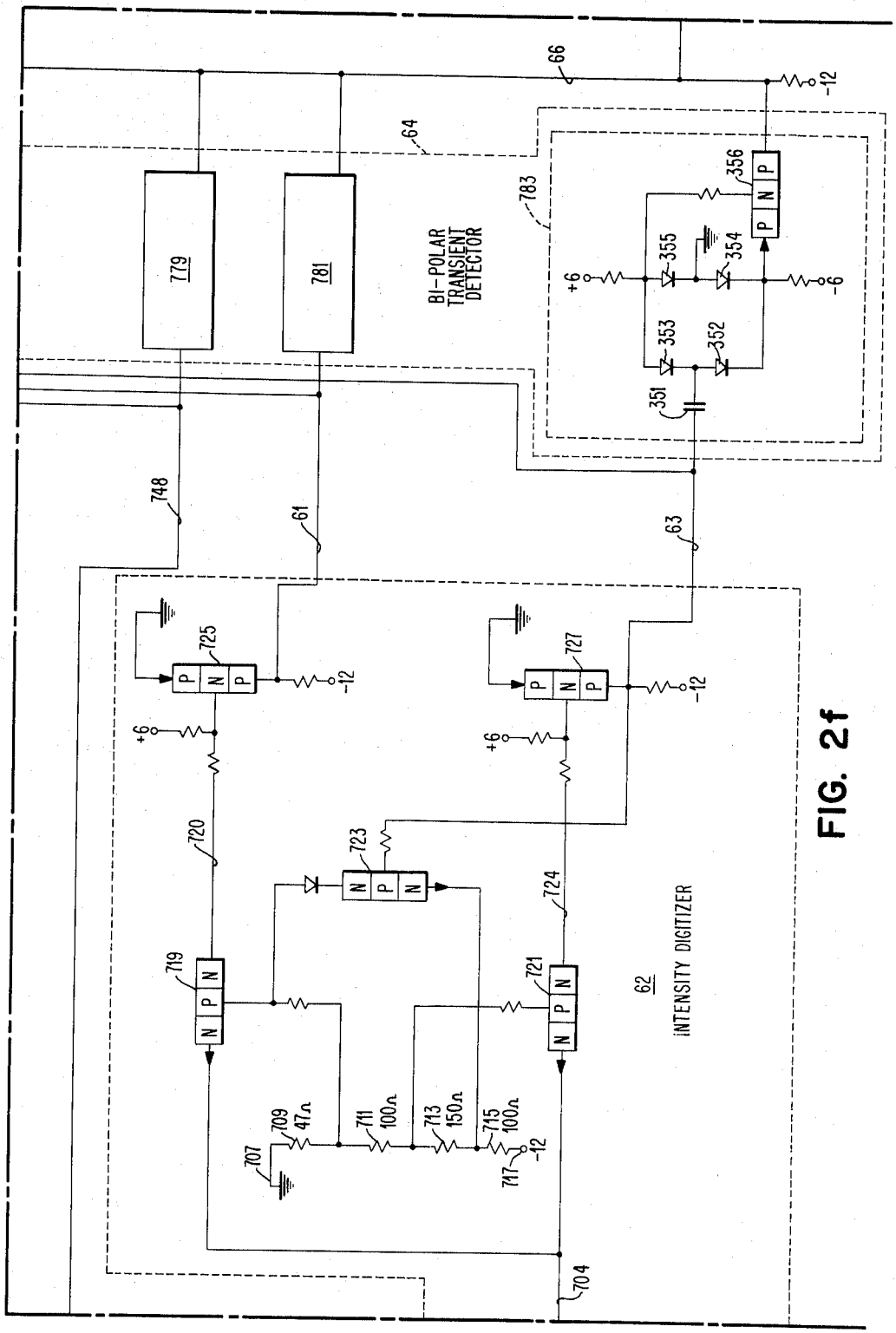
Figure 2G:
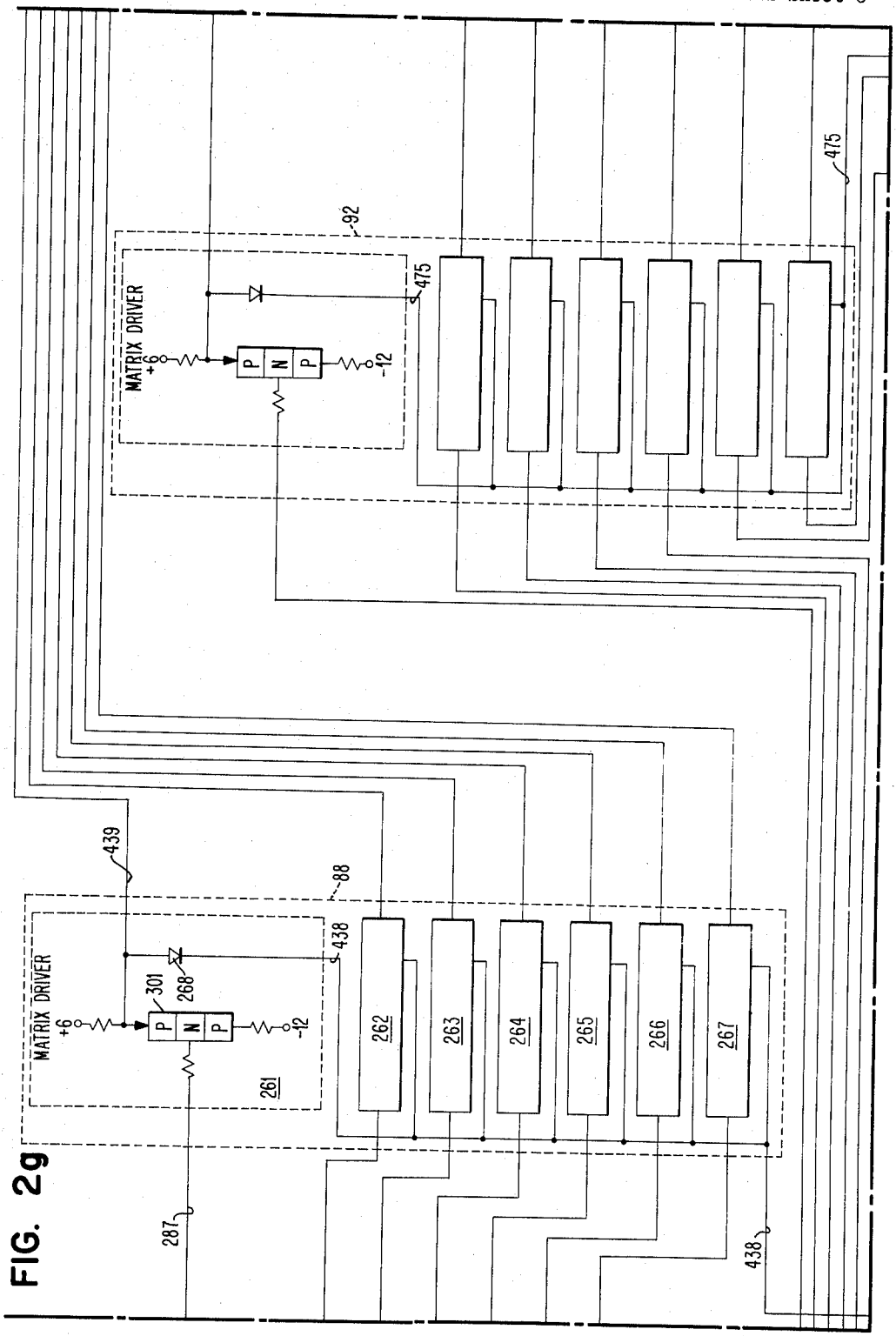

The pulse outputs from integrating shapers 42, 43, 45, 47, 49, 51, and 53 are applied to a series of matrix drivers indicated generally at 88, FIG. 2g. By means to be described presently, these matrix drivers are gated at the proper time to introduce the information into the matrix unit 44, FIG. 2j.

*Bi-polar transient detectors (FIGS. 2e, 2f)*

The outputs from the integrating shapers are also applied to a series of bi-polar differentiators 64 which are transient detectors to detect the initiation and termination of an output pulse from the shapers described above. A bi-polar transient detector 729 operates in the following manner, see FIG. 2f, particularly. It should be noted that this particular one is not connected to the integration shapers. Since they are all the same, there should be no confusion. A capacitor 351 is connected in the input and prevents D.C. response by the transient detector. The four diodes 352 through 355 act as a bridge circuit, and a transistor 356 is connected across the same. Under normal conditions, the transistor 356 will be biased off because of the grounded emitter connection and the plus base connection. However, when a positive portion of a pulse from the shaper is received, it is coupled through the diode 352 raising the emitter potential, allowing current to flow through the emitter base, and providing an output to the line 366 in the form of a positive-going pulse. By the same token, a negative-going pulse across a capacitor 351 will provide a current flow through diode 353, dropping the potential at the base of transistor 356 and allowing current to flow from the emitter to the base to again generate a positive-going pulse on the output line 357. This particular feature of the present invention is described and claimed particularly in application Serial No. 413,394, to Genung L. Clapper (docket 6353X–IBM).

*Change pulse generator 68 (FIG. 2i)*

The outputs 66 of the transient detector 64 are applied to a change pulse generator 68 across capacitor 376 to a transistor 377. A manual switch 375 or a machine input at 374 is connected to −12 volts when no words are being encoded to keep the emitter of transistor 377 at a minus voltage and prevent conduction upon occurrence of a positive-going pulse from transient detector 64 when words are being encoded, this minus voltage is removed. A positive-going pulse biases the transistor 377 to conduction to generate a positive-going pulse which is applied to a trigger circuit shown generally at 378. The trigger circuit 378 is conventional. A bias is supplied to a transistor 379 from a plus voltage supply so that the same is kept nonconducting. A transistor 380 is normally conductive by means of the negative supply attached to divider 381 and applied to the base of the transistor 380. A capacitor 382 is used for isolation and storage and with the resistors connected to the minus supply determines the on period of the trigger circuit. When the transistor 377 is rendered substantially conducting and a positive pulse is applied across capacitor 382, the transistor 380 is turned off, and the collector electrode drops to its minus supply voltage and renders the transistor 379 conducting. During this time, the positive voltage from the collector of transistor 379 is applied over a line 385. When the charge across capacitor 382 has decayed to the point at which the transistor 380 will be conducting, the trigger 378 switches, and the pulse on 385 terminates.

The output pulse generated on line 385 is applied across a resistor and diode 396 to an integrating pulse shaper substantially similar to that described previously. It will be remembered that this integrating pulse shaper accepts a series of A.C. pulse waveforms from some element connected thereto and provides a pulse of predetermined duration therefrom until the supply drops to another value. The duration of the pulse is set by adjusting the size of the capacitors. Here the input is a pulse on line 385 which raises the voltage at the transistor 397 for conduction and initiates the operation explained previously with relation to the integrating pulse shaper. Pulses on line 385 that are closer together than the limit of resolution set by adjustment 381 will be integrated into a single change pulse.

*Bi-polar differentiator 70 (FIG. 2i)*

The output change pulse at 399 is coupled to a bi-polar differentiator 70 which is essentially the same as that described previously, except in this case the bridge circuit 416 is responsive to the positive excursion of the pulse on line 399 to cause an output on line 473 and the negative excursion of the pulse to cause an output on line 422. This action is readily seen since the diode 419 will be rendered conducting on the negative excursion, and the negative bias to the base of transistor 417 will provide conduction in transistor 417. A positive-going output will appear on line 422. By the same token a positive-going pulse across diode 420 will raise the emitter voltage of transistor 418 and generate a positive-going pulse on the line 473.

A ring advance switch at 425 consists generally of a switch and a capacitor coupling 426 across the diode 427 to operate the transistor 418 to generate a pulse on 73. This is a manual type of arrangement for testing purposes.

*Sample pulse generator 72 (FIG. 2i)*

The pulse output on line 422 is connected to a sample pulse generator 72. The transistor 436, which is normally conductive by means of the bias at the collector of transistor 417, is rendered nonconducting by the positive pulse on line 422 which in turn also renders transistor 437 nonconducting and raises the voltage at the emitter of this transistor to furnish a positive-going sample pulse on line 438. This sample pulse is of short duration, for example 150 μs. The pulse appears on line 438 at the end of the change pulse indicating that sampling of the frequency band output of the integrators may take place. In a like manner to the trigger 378 previously described, a pulse on line 73 will operate trigger circuit 440. The output of this circuit is connected to the collector of the normally conducting transistor 441. On the arrival of an input pulse, the output 442 goes negative to provide a negative-going pulse. In this instance the output pulse is appreciably longer than for circuit 72, for example 300 μs.

Considering first the output on line 438, it will be noted that it is connected to the matrix drivers 88, FIG. 2g. Each driver 261–267 consists of a transistor 301 conducting or nonconducting, depending on the state of the integrating shapers of the frequency detection system. A diode 268, for example in driver 261, is normally biased to approximately −12 volts by the emitter voltage of transistor 437. When transistor 437 is rendered nonconducting, the diodes 268 are biased to raise the output, i.e., 439, to provide an output to the matrix unit 44 whenever the line 287 is near ground which makes transistor 301 nonconducting. Thus when the input to a driver is up, the transistor 301 will be nonconducting and raising the voltage on line 438 will generate an output pulse on line 439. By the same token if the input is down, the transistor 301 will be conducting, and the output cannot be raised.

*Matrix unit 44 (FIG. 2j)*

A storage matrix 44 is made up of a plurality of storage elements, only one of which is shown. This element consists of a diode coincidence circuit made up of diodes 450, 451, and 452 and transistors 453 and 454. When the line 439, for example, goes positive, the voltage at the intersection of the diodes 450 through 452 will rise, and this positive pulse will be coupled to the transistor 454 through diode 452 to render the same conductive. This drops the bias on the transistor 453 and causes conduction therein to set the transistors 453 and 454 both conducting to indicate that a bit has been sensed on the line 439 for this particular column of data. The column selection means is accomplished by means of the input line at 456 which when the particular column is to have information entered therein has a raised voltage so that the incidence of a positive voltage on line 439 will be detected by the diode 452. It can readily be seen that if the line 456 is at a negative voltage, the intersection of the diodes 450 and 452 will not see the positive-going pulse on the line 439.

*Ring drive and sample pulse generator (FIG. 2l)*

The output on line 442 which is a negative-going pulse of approximately 300 μs is applied to the bi-polar differentiator 76 which is the same identical circuit as shown at FIG. 2i. This circuit generates a positive-going pulse on line 472 for the negative excursion of the negative-going pulse on line 442 and a positive pulse on line 473 for the positive excursion of the pulse on line 442. A pulse appears on line 472 when a change is first evidenced in the output of the transient detector 64. This pulse is applied to the sample pulse generator 90, normally conducting and having a negative output voltage on line 475, which causes nonconduction in both PNP transistors, as discussed in relation to circuit 72, FIG. 2i, to generate a positive-going pulse of short duration on line 475. The positive sample pulse is applied on line 475 to the matrix driver 92 to initiate the same result as that discussed with relation to drivers 88. In this case, the input variables are different.

A rise in voltage on line 442, which is approximately 300 μs after the change was first initiated produces a positive pulse of about 30 μs duration on line 473 which is applied to ring drive pulse generator 83.

In this drive a transistor 481 is normally conductive, and the voltage at the emitter circuit of this transistor keeps the transistor 483 nonconductive to provide a minus output voltage on line 485. When a pulse is received on line 473, the transistor 481 will be rendered nonconductive, the voltage at emitter of transistor 481 will rise and render the transistor 483 conductive and raise the voltage at the emitter of transistor 483 to drive the matrix ring to be described presently. In summary, the bi-polar differentiator 76 provides (1) an indication that a change has been initiated in the lines being sampled by the bi-polar differentiator 64 and generates a read sample pulse on line 475 for another series of variables being sampled from the speech waveform, and (2) the line 485 has been driven on a positive excursion to generate a pulse of approximately 30 microseconds for the ring drive.

*Matrix ring and drive circuit (FIG. 2k)*

Consider the ring drive and ring circuit connected to line 485. The first stage of the ring labeled 501 which is the reset stage consists of transistors 503 and 505 having a resistor connection between the collector of 503 and the base of 505 and a connection between the collector of 505 and the base of 503. The stage 501 is set to an on condition by a control pulse of ground potential such as shown by the manual switch 507 or a control pulse entered on the line 508 as a function of the readout of data from the matrix or other control.

When a positive pulse is introduced on line 509, the same will be coupled to the base of transistor 505, causing transistor 505 to conduct and provide a negative potential to the transistor base 503 and cause conduction therein which in turn will furnish a substantially ground voltage to the resistor to the base of 505 to latch the transistor 503 and 505.

When the switch 507 is operated, the ground potential is removed from all storage elements, e.g., transistor 453, FIG. 2j, to reset the matrix storage 44 to zero. At the same time, potential is removed from the stages of the ring 86, e.g., transistor 516, to reset any stages in the ring to an off condition. The ring 86 is open, i.e., it does not provide a pulse from the last to first stage, and when the last column of information has been read, it is necessary to condition the same by the input at 507 or 508 and 511, line 508 going positive and 511 going negative as described above.

When the ring drive pulse on 485 occurs after the ring is reset, it is coupled through a diode 510 to the base of transistor 503 to bias the transistor 503 off. The resultant drop at the collector of transistor 503 operates to turn the transistor 505 off and at the same time generate a positive-going pulse on the line 512 to the next successive stage. This positive pulse on line 512 works into the transistors 514 and 516 essentially as described relative to the previous stage with the exception that the positive pulse from the collector of 516 appearing on line 517 is also coupled to a transistor 518. Transistor 518 is turned off by the positive pulse which in turn turns 519 off and raises the output voltage on line 456. This allows the information to be read into the column of storage elements connected to line 456. For the next successive ring drive pulse, the ring will be stepped to activate the next column of storage elements in the matrix.

*Readout ring (FIG. 2m)*

The readout ring for reading out the matrix in which the columns of bits are stored consists essentially of the same type of ring as that discussed previously. The readout ring has a stage 525 which is the normal home stage of an open ring and is reset to this position by control pulse on line 529 which may be from an external unit or from a reset key 530. The stage 525 is the same as the one as shown in 501 for the reading ring. A ring drive pulse generator which has not been shown particularly here and which would be external to the machine, generates a pulse on line 532 to turn off the stage 525 and to switch on stage 526 in essentially the same manner as discussed previously. However, the output of stage 526 is taken here from the collector of a transistor 535. When the stage 526 is on, the output will be at a low voltage to bias a transistor 527 off and provide a lower voltage on line 528. This action continues for every ring drive pulse so that successive voltages will appear on line 528 for successive stages.

The negative voltage on line 528 is applied to each column of the matrix as shown particularly on FIG. 2j, where the negative voltage is applied to this line and across the diode 537. If the storage device as shown in the storage arrangement is off, the diode 539 will be biased with a +6 volts, and the intersection between the three diodes will be at +6 volts and the negative-going excursion on line 528 will not affect the storage elements 453, 454. If, however, the latch circuit is storing a bit, then the anode of the diode 539 will be at a substantially −6 volts potential, and the fall of the input 528 to a −6 volts will drop the potential at the intersection, and the readout line 541 will indicate a negative-going pulse. The line 541 is common to a row of storage elements. There are, of course, as many lines 541 as there are rows, i.e., 14 in this case.

Summarizing the operation of sensing and storing variables, it should first be noted that the frequency band sampling is achieved through matrix driver 88. A matrix driver 92 is used for the other variables. All information storage is, however, accomplished by a timing cycle initiated by a change in a variable which is indicated at the output 66, FIGS. 2e and 2f of the transient detectors 64.

When this change is evidenced on output 66, FIGS. 2e and 2f, and an enabling switch 375, FIG. 2i, is open thus removing the −12 volt supply from the emitter of transistor 377, the change pulse generator 68 will provide an output pulse on line 399 of approximately 12.5 milliseconds. It is to be understood that while a manual switch 375 has been shown, a pulse input on terminal 374 can be used to accomplish the same result.

If the output 66 carries pulses at close intervals, the trigger 378 emits more than one pulse, and these are integrated by the integrator. The pulse output on line 399 will have a longer duration.

On the positive rise of the pulse on line 399, FIG. 2i, indicating an initiation of a change in variables, the output 73 will have a pulse impressed thereon to actuate trigger 440, delay circuit 74. This trigger generates a negative-going pulse on line 442 of approximately 300 μs. duration.

The negative excursion of this pulse, which is still essentially coincident in time with the change in variables, causes a pluse to be generated on line 472, FIG. 2l, to energize the sample pulse generator 90 which in turn by an output 475 gates matrix driver 92.

If this is the first time sampling of the speech wave, it will be remembered that the matrix ring is providing an output from stage 501 only, which does not energize any column of elements in the storage matrix, and therefore the variables at gate driver 92 at the initiation of a sensing operation are not stored. This, of course, obviates the storage of information not concerned with the word being sensed and which was generated between words. However, at other subsequent times, the information will be stored in the column of the matrix unit 44 indicated by the stage in the driver circuit which is on.

When the delay circuit 74 goes to its positive output, the line 442 will experience a positive excursion in voltage which is sensed by the differentiator 76, FIG. 2l, to generate an output on line 473 to drive a ring drive pulse generator 83.

The pulse generator 83, by an output 485, steps the matrix ring 86 to activate the next column of storage elements. An output pulse on line 486 is used as a stop for a timer, FIG. 2h, to be subsequently described. Thus a predetermined period after the changes in variables have been sensed, the ring drive 86 is stepped and is available for the next series of data.

Figure 2H:
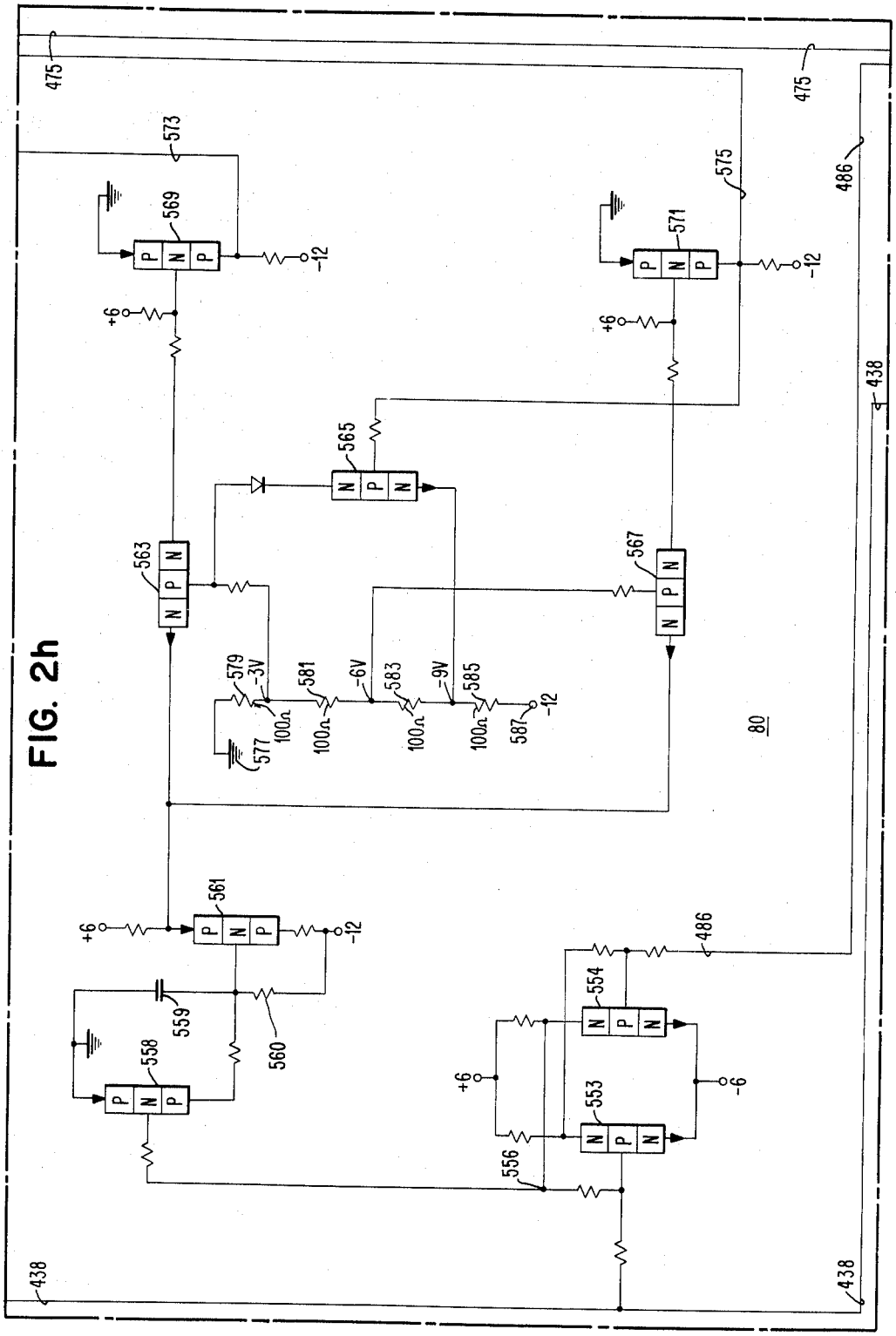
Figure 21:
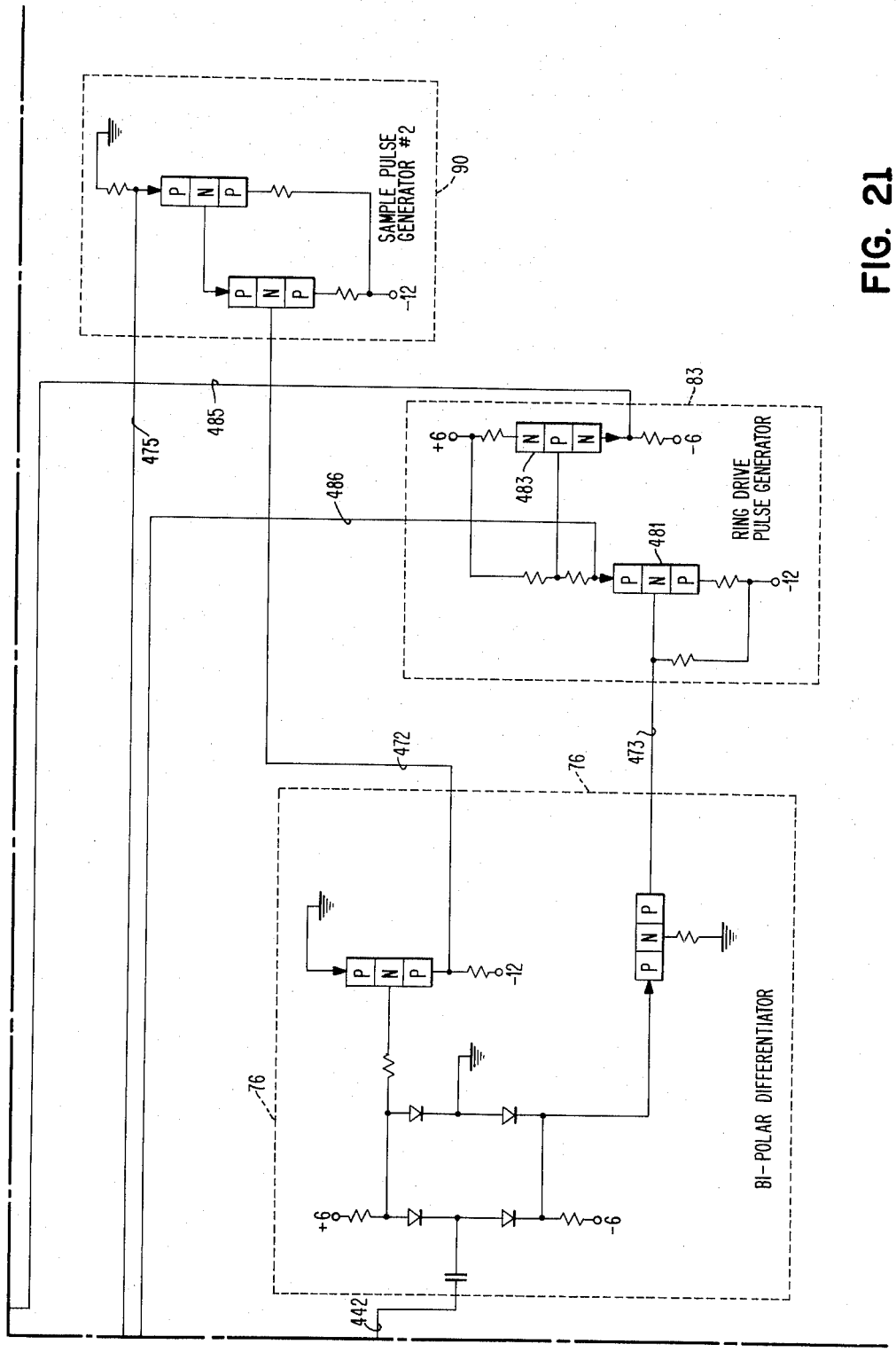
Figure 2M:
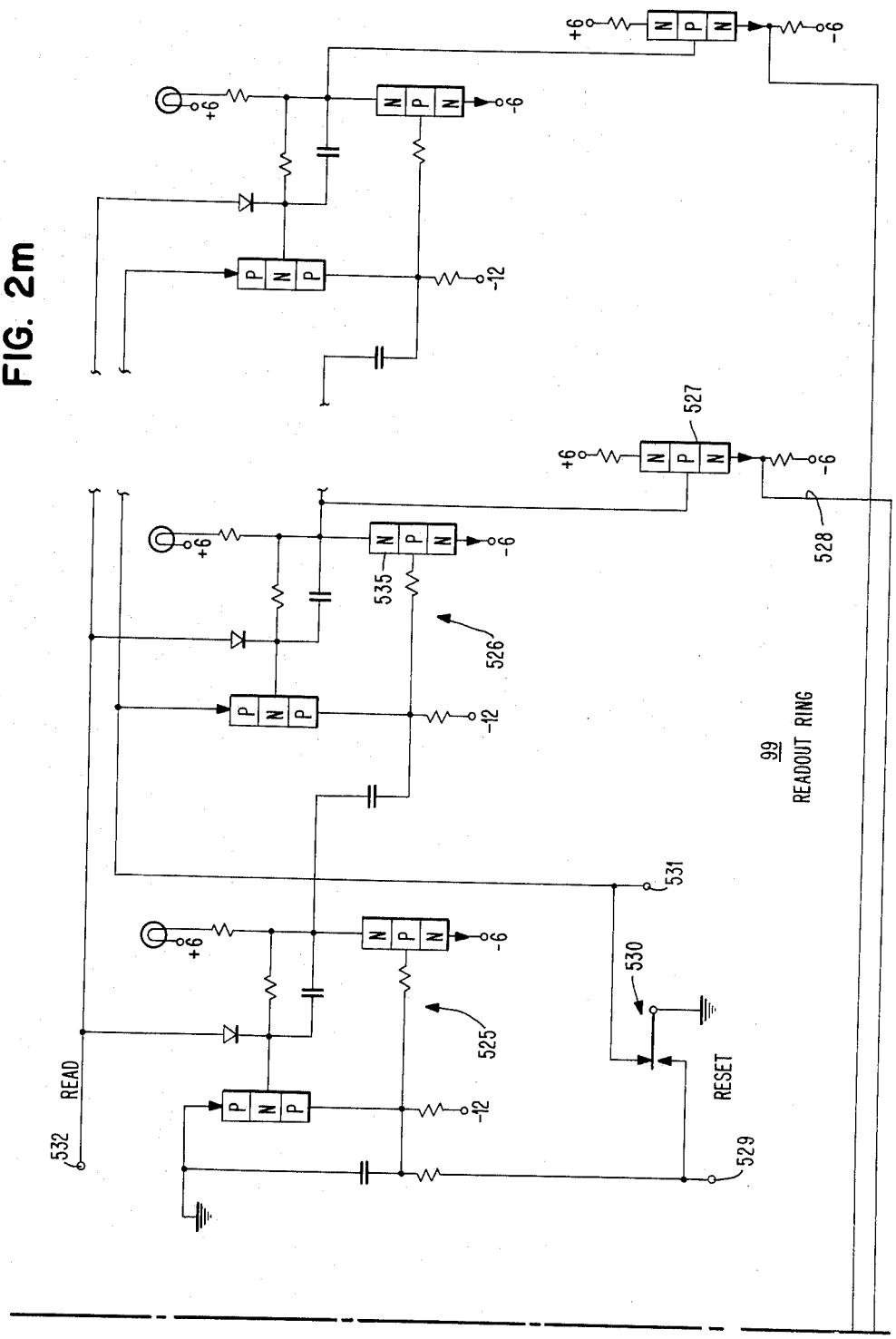

When the output 66, FIGS. 2e and 2f, ceases to indicate changes in variables, the output 339, FIG. 2i, will drop to a low voltage, and a pulse will be generated on line 422 to energize the pulse generator 72. The output of the pulse generator 72 is coupled to matrix driver 88 to gate the frequency band indications in to the matrix unit 44. At the same time, a timer, FIG. 2h, is turned on to accumulate time between changes. At the next initiation of a change in variables, all variables other than frequency at that time will be stored in the same column of the matrix 44 as the frequency bands which were stored therein at the beginning of the no change period.

*Log time digitizer (FIG. 2h)*

When the sample line 438 energizes the drivers 88 and allows the frequency band sample to be entered into the storage matrix 44, the pulse is also coupled to a log time digitizer 80, FIG. 2h. In the digitizer 80 is contained a flip-flop circuit consisting of two transistors 553 and 554 coupled together through resistances from collector to base so that a positive pulse to the base of transistor 553 will provide conduction through the transistor and drop the voltage at the collector and bias the transistor 554 to nonconduction. The output line 556 will rise. A positive pulse input to the flip-flop circuit at 486 which is the initiation of a change in variables turns the flip-flop 553 and 554 to its off condition, and the output line 556 drops down by virtue of the conduction in transistor 554.

The output 556 is coupled to a transistor 558 to turn the same to an off condition when output 556 is positive to allow a capacitor 559 to discharge through a resistor 560 to furnish a voltage value proportional to the logarithm of time. The PNP transistor 561 is responsive to the changing voltage on the capacitor 559 to provide an output signal corresponding thereto.

An analog to digital sampling circuit consisting of transistors 563, 565, and 567 is connected to the output of transistor 561 to digitize the output therefrom. If the value of the voltage at the emitter of the transistor 561 is more positive than −3 volts, the transistors 563 and 567 will be nonconductive, and the PNP transistors 569 and 571 will be maintained nonconducting and the output 573 and 575 will have a low voltage output, i.e., no indication. When the value of the voltage at the transistor 561 is at a value more negative than −3 volts but more positive than −6 volts, the transistor 563 will conduct and cause conduction in transistor 569 and provide a positive output on the line 573, i.e., a "1" indication. When the amplitude of the voltage at the emitter of the transistor 561 is more negative than −6 volts and more positive than −9 volts, the transistor 567 will conduct causing conduction in the transistor 571 to raise the output 575 to indicate "1." At the same time the rise in voltage at the collector of transistor 571 will bias the transistor 565 to conduction and allow the voltage at the collector of transistor 565 to drop to a value of approximately −9 volts. The collector voltage of transistor 565 biases the base of transistor 563, thereby cutting the same off and allowing the line 573 to drop to its low value indicating "0." When the voltage on the input of this digitizing circuit reaches a value more negative than −9 volts and more positive than −12 volts, the transistor 563 will again resume conduction, and the line 573 will again rise to provide an output on both 573 and 575.

Therefore, the digitizing apparatus shown produces four outputs, low voltage on both lines 573 and 575, raised output on 573 and low output on 575, raised output on 575 and low output on 573, and a raised output on 573 and 575. The outputs 573 and 575 are coupled to the matrix driver 92, FIG. 2g, and when the pulse on line 475 is applied, the information is entered into storage matrix 44.

*Voice inflection detection (FIGS. 2a, 2b, 2e, 4 and 5)*

This circuit abstracts information from the complex speech waveform pertaining to the changes in the fundamental pitch. It is well known that pitch varies from one individual to another so that this is not an invariant measure but the changes that occur in normal speech are very similar for all individuals. This is partly the result of the actual physical process involved in speech production but is perhaps mainly the function of training and is a direct result of audible feedback.

The first step in detecting voice inflection is to detect the fundamental frequency of the voice itself. Then a means must be found to detect relatively small and slow acting changes. As discussed previously with relation to the preamplifier, FIG. 2a, a signal is produced on line 48 which is at the same frequency as the fundamental frequency of the voice. This was obtained while generating the AGC voltage and monitoring the peaks that occurred at the points where the pressure time pattern of the sawtooth waveform from the vocal chords is at a maximum. Thus there is a convenient measure of fundamental frequency. As mentioned previously, the fundamental frequency of itself does not appear to be important in extracting intelligence therefrom. However, the changes in fundamental frequency or the inflections given to various words is found to be very important in differentiating in words which may have the same substantial frequency changes throughout the word.

The pulses at the fundamental frequency at terminal 48 are coupled through a diode 595, FIG. 2b, to an integrating network consisting of resistor 596 and capacitor 598, line A, FIG. 4. The positive-going pulses on line 48 charge the capacitor 598 and start conduction in transistor 600. The transistor 600, when starting into conduction, supplies current to one side of the capacitor 598. This effect acts as a smoothing type of integrating device for the incoming square appearing waves which may be quite ragged. Small negative excursions, etc., on the positive-going wave forms on line 48 will be resisted by the capacitor 598 which is being held up by the current action of the transistor 600 on the opposite plate of the capacitor.

The resulting square wave suitably smoothed appears at the collector on the transistor 600 and is applied to the base of a transistor 602. When the potential at the collector of transistor 600 reaches a value sufficiently negative, the transistor 602 will be biased into conduction to supply a positive-going pulse through diode 608 to the output lines 604, line B, FIG. 4. This positive-going pulse is reflected back through capacitor 606 to reinforce the conduction of transistor 600 so that now both transistors 600 and 602 are conducting.

The potentiometer 611 can vary the time in which it takes the positive charge produced on the capacitor 598 to decay. This allows a differentiation to be made for masculine and feminine speakers since it is possible that the feminine speaker might produce positive-going pulses on line 48 with a frequency too high to allow capacitor 598 to discharge. When the capacitor 598 has discharged sufficiently from the pulse on line 48, the potential at the collector of transistor 600 will drop and bias off the transistor 602. The diode 608 through which the pulse is transferred into the line 604 was utilized to bias the transistor 610 to an off condition. Ordinarily when the transistor 602 is off, the transistor 610 is biased to conduction by the −12 volts to the base. Therefore, when the transistor 602 is cut off and the line 604 drops to the −12 volts, a sharp negative excursion is reflected back through the capacitor 606 to insure cutoff of transistor 600. The circuit 56 therefore has reached a stable condition and is ready for the next positive-going pulse on line 48.

The output 604, line B, is applied to a balanced integrator from which is derived a voltage proportional to the frequency of the digital pulse input. This integrator is a novel circuit and differs from known former integrators in that the voltage output for no input is the same as that for a median frequency input. Thus a change from no signal to the median frequency produces no change in the output. This allows an input to be intermittent with a minimum of delay incurred at the beginning of each group of pulses.

The great advantage in using this type of integrator is that no recovery time is lost in going from a no signal condition to a normal condition. In addition the characteristics of the circuit insure fast response and short as possible recovery time from abnormal conditions. Any changes in frequencies is promptly reflected in the change of output voltage.

If there are no pulses present on line 604, capacitors 621 and 623 isolate the output 604 from D.C. voltages so that the points 625 and 627 will not be affected by D.C. conditions. Point 627 will be very near ground potential or zero volts by virtue of the diode 629 and point 625 very near the negative potential −12 volts by reason of the clamp diode 631. With point 627 at zero volts and point 625 at −12 volts, no cutoff bias can be supplied to either transistor since the PNP transistor 633 needs a voltage more positive than zero and the NPN transistor 635 needs a voltage more negative than −12 volts. Both transistors therefore will conduct and base current flows as follows: From ground 636 to the emitter of transistor 633 to the emitter base junction to the base of 633 through the resistors 637 and 639 to the base of transistor 635 through the emitter base diode of the transistor 635 to −12 volts. Transistor current will therefore flow from ground 636, transistor 633, resistor 641, resistor 643, transistor 635, to −12 volts. Current flowing in this circuit holds the output voltage at output 645 to −6 volts since both transistors will be saturated, and there will be little voltage drop across either one.

The transistor 635-capacitor 640 combination as well as the transistor 633-capacitor 638 combination are Miller integrators. A Miller integrator is essentially an integrator having an amplifier connected to the output, and a degenerative feedback from the output of the amplifier to the output of the integrator to insure stability of operation.

For example, in the pulse input to the integrator 628, 638, the negative level will cause conduction in transistor 633 of a predetermined amount which will be resisted by the positive-going output pulses at the collector of transistor 633 reflected across the capacitor. By the same token, the positive rise at the base of 633 will be retarded by the collector current in the opposite phase. Thus the voltage at the collector will tend to remain constant for pulses having approximately 50% duration. As the pulses increase in negative duration, the transistor 633 will approach more closely to full conduction and ground potential will be present at the collector.

At the same time that this is happening, the integrator 626 and 640 with transistor 635 works inversely and transistor 635 will gradually cut off. Potential at output 645 will then approach ground.

For pulses which have a longer positive duration, the inverse of the above will occur, and line 645 will approach —12 volts.

While the Miller integrator is well known in vacuum tube technology and the circuitry just described is substantially the entire circuit, it should be appreciated that the transistor introduces an additional factor. This is the amplification factor which is very large in transistors and would in essence operate to move the output very rapidly to one extreme of output voltage or the other dependent on the positive or negative duration of the input pulses.

In order to prevent this event, the output 645 is fed back degeneratively by means of resistors 642, 637, and 639 to the inputs of the transistor 633 and 635. The input resistors allow the output to assume an output voltage that continuously provides information as to the input pulse rate.

FIG. 4 illustrates the input waveforms and resulting output voltages.

The pulse chart of FIG. 4 shows the balanced integrator 56 with a number of different pulse conditions. For example, the normal input condition with input pulses having a period P1, the pulses, line A, are those which appear on line 48 indicative of the fundamental frequency of the sawtooth waveform used by the speaker. The pulses B are the integrated pulses which appear on the output line 604 of the integrating circuit. Pulses are shown on the lines C and D which are the voltages which appear at the point 627 and point 625, respectively of the balanced integrator. These waveforms C and D have been labeled biased condition and conducting condition so that during the period labeled biased, the transistor connected to point 627, which is effected by the pulses shown on line C, will cause conduction in the transistor 633 when the pulse waveform is in a down condition with the minus 1 voltage. On the up portion of the pulse, line C, the transistor 633 will be biased off.

The waveform, line D, which is applied at point 625, FIG. 2b, causes the opposite results. The transistor 635, which is the NPN type, is cut off when transistor 633 is conducting and vice versa.

A change in frequency to a lower frequency of period P2 results in a 40% bias condition for the PNP transistor 633 and a 60% conduction period while conversely the NPN transistor will now have 60% for bias and 40% for conduction. Under these circumstances, point E which is the output 645 of FIG. 2b will rise to —4 volts. For a higher frequency of period P3, the transistor 633 will conduct only 20% of the period while the transistor 635 will conduct 80% of the time, and the voltage at the line 645 will drop to —10 volts.

FIG. 5, in part, shows the similar waveforms to that shown in FIG. 4. The output 48 shown in the first column is indicative of the pulse input, line A of FIG. 4. The output 645 is the output from the balanced integrator and shows that for no voice condition or steady voice condition the output is the same. On a rising voice condition, the output 645 drops as indicated in FIG. 4 to voltages approaching —12. A falling voice wherein the pulses period P1 is more extended in time will provide an output 645 which rises similar to that shown for period P2, that shown in FIG. 4. The remainder of the chart will be explained subsequent to the description of the inflection detection circuit logic.

The output 645 of the balanced integrator is applied to an input clamp 647 which is rendered conducting by an input 646 to the base from the voice circuit 55, FIG. 2c, which provides —12 volts to the base and keeps the line 645 at —6 volts regardless of the integrator action during the no voice periods. When voice is present, the clamp 647 is off and the output on 645 is applied to a low pass filter 649. Under the steady voice condition or no voice condition, the input will be at or near —6 volts. Under these conditions, the transistor for the low pass filter which consists essentially of the capacitor resistance network 649 and transistors 651 will reject jitter noise on the line 645 and pass only the low frequencies and provide an output 653 at approximately —6 volts.

With line 653 in a steady state condition, no changes will be reflected across capacitors 655 or 657, FIG. 2e. Under these conditions, the transistor 659 having a diode connected from the base to the emitter 660 will not conduct, and the PNP transistor 661 will conduct and provide a raised voltage condition signal on line 667. The NPN transistor 663 will be biased to conduction by the connection from ground through resistor 666 to the base, and the emitter to —12 volts to provide a negative signal at the collector of transistor 663 and cause conduction in transistor 665 and therefore cause the line 669 to be in a raised voltage condition. Therefore under no voice or steady voice condition, both lines 667 and 669 will be up and conditioning the AND circuits 671 and 673.

A negative change on line 645 which it will be remembered is a rising inflection will be coupled to the line 653, and this negative change will cut off the transistor 663 and this in turn cuts off transistor 665 and causes the line 669 to drop to a low voltage output which is applied to the AND circuit 673. The negative voltage swing at emitter of transistor 659 will be clamped by the current flowing in the diode 660 connected to ground.

By the same token a positive change on the line 653 indicating a falling inflection will be coupled through the capacitor 655 and 657 and cause conduction in the transistor 659, resulting in nonconduction of the transistor 661 and cause the line 667 to drop which signal is applied in circuit 671.

Summarizing therefore the lines 667 and 669 are usually up and one or the other drops out for a rising inflection or for a falling inflection. These outputs are applied to the AND circuits 671 and 673 by means of an input from the voice circuit 55 and AND circuits 671 and 673 will not be enabled until there is voice. When both inputs to the AND circuits 671 and 673 are up, the transistor 675 or 671 is conditioned to conduct and an appropriate output is provided on line 57 or line 52 to the transient detectors 775 and 777 connected thereto. The outputs of the inflection detection circuits are also connected to the matrix drive 92, and this information entered into the matrix 44 when the drivers 92 are enabled.

As indicated previously, the output on line 645, FIG. 2b, is the same whether a voice is being provided or not. It will be remembered that the transistor 647 is conditioned by line 58 indicating the presence of a voice. Therefore, if no voice is present, the lines 667 and 669 are up as indicated for no voice or steady voice and connected to the AND circuit 671 and circuit 673. It will be remembered under the no voice condition however that the line 58 will be down, and the AND gates will not be enabled so that under no voice condition the lines 57 and 52 will be down. Under the steady voice condition, the line 58 will be up, and the AND circuits 671 and 672 will be enabled and both lines 57 and 52 will be up for an indication of steady voice. For the conditions of rising voice and falling voice, FIG. 5 shows clearly the outputs which will be present on lines 57 and 52 under each of these conditions.

Intensity digitization (FIGS. 2e and 2f)

The automatic gain control signal on line 59, FIG. 1a, is an indication of the amplitude of the input signal envelope variation. This signal on line 59 is passed through a low pass filter consisting of the resistance capacitor sections 701 and a transistor 703, FIG. 2c, to furnish an output on line 704 without high frequency fluctuations. The analog to digital circuit to which this signal is furnished consists of transistors 719, 721, and 723, FIG. 2e. A voltage divider network connected from ground 707 to a source of potential of −12 volts 717 has four resistors 709, 711, 713, and 715. These resistors connected between ground and the voltage source provide a series of biasing voltages to the base of transistor 719 and transistor 721 as well as to the emitter of transistor 723 to coact with the transistor 723 in the following manner. The voltage at the intersection of resistor 709 and resistor 711 is approximately −1.5 volts while the voltage between resistors 711 and 713 is approximately −4.5 volts, and the voltage between resistors 713 and 715 is approximately −9 volts.

The action of the intensity digitizer is as follows. When the voltage on line 704 is less than −1.5 volts, the NPN transistor 719 will be cut off, and line 720 will be high. The PNP transistor 725 will be cut off, and the output on line 61 will be low to the bi-polar differentiator 781 and the matrix drivers 92. By the same token the transistor 721 which was biased by the −4.5 volts will also be cut off, and the line 724 will be high, causing nonconduction in transistor 727 providing the low level signal on line 63 to the bi-polar differentiator 729 and matrix drivers 92. When the voltage goes below −1.5, the emitter base diode of transistor 719 will conduct current, and the transistor 719 will go into conduction, dropping the line 720 and causing conduction in transistor 725 and raising the output on line 61. The transistor 721 however being biased by voltage on the base thereof of a magnitude less than that on the emitter will not conduct, and line 724 will remain up and therefore the line 63 will be down. If the voltage goes below −4.5 but less than nine volts, the transistor 721 will conduct to lower the voltage on line 724 to cause conduction in transistor 727, raise the voltage at the collector thereof, line 63, and cause conduction in the transistor 723 and therefore provide a bias to the base of the transistor 719 to the −9 volt tap of the voltage divider so that the voltage between −4.5 and −9 volts will not cause conduction in the transistor 719 and the line 61 will restore to a down level. When the voltage on line 704 goes below −9 volts, then the −9 volt bias provided to the base of the transistor 719 through the transistor 723 will allow the transistor 719 to conduct when a signal lower than −9 volts is applied to the emitter thereof and to drop the voltage on line 720 and cause conduction in transistor 725 and allow the line 61 to go up. In this way, binary valued outputs are created which are a measure of the absolute intensity.

Roughness measure (FIG. 2c)

As described previously in the preceding sub-section, the sub-section, the envelope variations of the input signal are digitized, and the output furnished to the bi-polar differentiators to indicate changes in signal envelope. However, in order to help aid in the identification of such difficult constants consonant sounds as *l, m, n,* and *r,* this circuit has been introduced. It performs a function of looking for roughness in the AGC waveform. As mentioned previously, gross variations in the AGC waveform will be coded by the intensity digitizer. This circuit will show the variations that exist between digital values of the AGC and recognize variations as shown in FIG. 6 that go from a positive to a negative slope but not to the reverse condition, since the change from a negative to a positive slope is a normal short sound effect for a number of letters such as T.

The circuit functions in the following manner. The input on line 59 is furnished to a transistor 727 by means of a differentiating network consisting of capacitor 728 and resistor 729. For negative excursions, the transistor 727 will be turned on, and the voltage at the collector will rise and furnish an input to the AND circuit 731. However it is necessary to have an additional input at line 733 before an output on 735 will be generated. The positive pulse on line 59 will be differentiated across the circuit consisting of capacitor 737, resistor 739, and the signal impressed on the base of transistor 743 through diode 741. The circuit consisting of transistor 743 and transistor 745 is similar to that described in the change pulse generator 68 and will produce a positive pulse in this instance of approximately 60 milliseconds duration. Therefore, a change in the positive direction for generating a long pulse followed by a negative pulse on line 730 will generate an output on line 748 which will be received by an integrating circuit 747 and 749 which is the same as that described previously to generate an output pulse of a predetermined duration to indicate roughness in the AGC voltage. This measure is likewise connected to transient detector 64 and matrix drivers 92 so that this information may be entered into the matrix.

In FIG. 6, it is shown diagrammatically the action of the roughness measure circuit. Here the AGC voltage which is the output of line 59 from the preamplifier is furnished into both of the transistors 727 and 743. As can be seen in FIG. 6, this voltage rises up and down but it is only during a portion of the AGC waveform which shows pronounced roughness that an output 748 will be generated. As remarked previously, the roughness measure circuit detects the change of slope from a positive slope to a negative slope where these two occur within 60 milliseconds of one another. This it will be remembered is taken care of by the overlap condition of the transistor 727 operation and the integrating circuit 743 and 745. The positive slope which first occurs in the AGC waveform is the sharp excursion at the low point of the wave which would be detected by the transistor 743 which would go into conduction and generate an output pulse to be applied on the line 733 for a predetermined duration. If the pulse on line 733 is followed by a negative pulse on the line 59, such as shown in FIG. 6, transistor 727 will conduct and bring up the line 730 and therefore reflect the pulse on line 735 to the integrator 747 and 749 to generate the first portion of the output pulse on line 748. During a continuous roughness, such as shown in FIG. 6, the output of line 748 will remain on and will be reinforced each time there is a positive slope and a negative slope occurring in rapid succession until the point at which it does no longer occur, such as shown in the termination of the pulse 748.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for reducing redundancy in digital data comprising:
   (a) means for discretely manifesting said data in digital form;
   (b) output means;
   (c) gating means connecting said means for manifesting to said output means;
   (d) change responsive means connected to said manifesting means and responsive to changes in said data for operating said gating means to connect said manifesting means to said output means whereby data on said output means will differ always with that which immediately preceded the same; and clock means responsive to each new datum at said manifesting means for accumulating time and means responsive to the next successive change for providing an indication of said accumulated time to said output whereby said data output includes an indication of time between changes.

2. Apparatus for reducing redundancy in digital data comprising:
   (a) means for discretely manifesting said data in digital form;
   (b) output means;
   (c) gating means connecting said means for manifesting said output means wherein said gating means when operative transfers data from said manifesting means to said output;
   (d) a transient detector connected to said manifesting means to generate an output pulse when said digital data changes;
   (e) a change pulse generator connected to said transient detector and responsive to an output pulse therefrom to generate a change pulse having a duration approximating the resolution desired in said output data; and
   (f) means responsive to said change pulse for operating said gating means whereby data from said manifesting means appears at said output.

3. The apparatus of claim 2 wherein said change pulse generator includes means responsive to output pulses from said differentiator less than said resolution time to extend the time period of said output pulse from said change pulse generator whereby changes in data at said manifesting means less than said resolution time will not be represented in said output.

4. The apparatus of claim 3 further including:
   (a) clock means for generating an indication of time and applying the same to said gating means;
   (b) means responsive to the termination of said change pulse for starting said clock means; and
   (c) means responsive to the initiation of said change pulse for sampling the accumulated time, whereby said output contains an indication of the time between changes.

5. In an apparatus for reducing redundancy in digital data,
   (a) a transient detector responsive to a change in digital data for generating an output pulse;
   (b) a change pulse generator connected to said transient detector and responsive to an output signal therefrom for generating a change pulse having a duration approximating the resolution desired in said digital data;
   (c) differentiating means connected to said change pulse generator and responsive to the initiation of said change pulse for providing an initiation output signal;
   (d) means responsive to said differentiator initiating output signal to generate a sample pulse whereby selected data may be sampled;
   (e) said differentiating means being further responsive to the termination of said change pulse to provide a termination output signal; and
   (f) means responsive to said termination output signal to generate a sample pulse whereby selected data may be sampled.

6. The apparatus of claim 5 wherein said change pulse generator includes:
   (a) means responsive to successive transient detector pulses occurring within the period of said change pulse for extending the period of change pulse;
   (b) whereby successive changes in data occurring within said resolution time will delay the termination sample pulse and only data appearing subsequent to the last change will be sampled.

7. The apparatus of claim 6 further including:
   (a) clock means for generating an indication of time;
   (b) means connecting said termination pulse to said clock for starting the same; and
   (c) means responsive to said initiation sampling pulse for sampling the time indicated by said clock.

8. The apparatus of claim 7 including:
   (a) a storage for sampled data;
   (b) means conditioning said storage to accept each successive set of sampled data;
   (c) delay pulse means responsive to the initiation of said change pulse to generate a delay pulse; and
   (d) means responsive to the termination of said delay pulse for operating said condition means to condition said storage means to accept the next sampled data.

9. A sound analyzing system comprising:
   (a) means for accepting sound waves and generating electrical signals corresponding thereto;
   (b) a preamplifier connected to said electrical signal generating means for amplifying said electrical signals to provide an output signal envelope of constant amplitude consisting of all said electrical signals;
   (c) a plurality of pre-emphasis amplifiers connected to the output of said preamplifier, each tuned to amplify selected portions of the frequencies contained in said output signal envelope from said preamplifier;
   (d) a plurality of frequency band selectors connected to said pre-emphasis amplifiers, each band selector being tuned to detect the presence of preselected contiguous bands of frequencies and provide an output signal indicative of the same; and
   (e) a plurality of integrating pulse shapers connected to the output of each of said band selectors and responsive to an output signal therefrom over a period of time to generate an output signal pulse indicative of the presence of the band of frequencies.

10. The apparatus of claim 9 wherein one of said frequency band selectors is a sibilant noise selector,
    (a) said sibilant noise selector being connected to a pre-emphasis amplifier having broadband amplifying characters and including:
    (b) a difference amplifier having two inputs and an output wherein the output signal is a function of the difference between input signals;
    (c) a low pass filter connected in one of said input connections wherein only low frequencies are passed;
    (d) whereby the output signal of said difference amplifier is the high frequency or sibilant content of said signal from said pre-emphasis amplifier.

11. The apparatus of claim 9 wherein one of said frequency band selectors is a sibilant noise selector,
    (a) said sibilant noise selector being connected to a pre-emphasis amplifier having broadband amplifying characteristics and including:
    (b) a first transistor amplifier having an input connected to said pre-emphasis amplifier;
    (c) a second amplifier having an input connected to said pre-emphasis amplifier and an output;
    (d) a low pass filter connected in said input connection to said second amplifier to pass only low frequencies;
    (e) means for connecting a current supply to said first and second amplifiers wherein the current supplied said second amplifier is inversely proportional to the conduction current in said first amplifier;
    (f) whereby the output signal of said second amplifier is the difference between the current supplied thereto and the low frequency input signal which is the high frequency or a sibilant content of said signal from said pre-emphasis amplifier.

12. A sound analyzing system comprising:
    (a) means for accepting sound waves and generating electrical signals corresponding thereto;

(b) amplifying means responsive to said electric signals for amplifying the same;
(c) amplitude detecting means connected to the output of said amplifier and responsive to the magnitude of the amplified signals for generating an output signal whose frequency is indicative of the amplitude of said signals;
(d) an integrating network responsive to the signals generated by said amplitude detecting circuit for generating an output signal voltage indicative of the amplitude of said input signals; and
(e) intensity digitizer means responsive to the amplitude of said signal from said integrating circuit for generating a digital output signal indicative of the amplitude of said input signal envelope;
(f) whereby the amplitude of the output signal from said amplifying means is continuously digitized as a function of the integrated variations in the signal envelope composed of all electrical signals.

13. The apparatus of claim 12 further including:
(a) a roughness measure circuit connected to said integrator for determining the roughness in the amplitude variations, said roughness measure circuit comprising:
(b) first means responsive to an increase in said integrator output signal for generating a pulse having a predetermined duration;
(c) second means responsive to a decrease in said integrator output signal for generating a pulse of shorter time duration;
(d) coincidence detecting means connected to said first and second means and responsive to a coincidence of said pulses to generate an output signal therefrom; and
(e) pulse responsive means connected to said coincidence circuit to generate an output signal indicative of roughness in the intensity wave in response to an output signal from said coincidence circuit whereby said roughness circuit will detect amplitude variations which rise and fall in sequence.

14. A sibilant noise selector for selecting the sibilant or high frequency content from an input signal;
(a) a difference amplifier having two inputs and an output wherein the output signal is a function of the difference between input signals;
(b) a low pass filter connected in one of said input connections wherein only low frequencies are passed;
(c) means for connecting said input signal to one input of said difference amplifier and to said low pass filter,
(d) whereby the output signal of said difference amplifier is the high frequency content of said input signal.

15. In a complex wave analyzing system comprising:
(a) first means for analyzing said complex wave for providing a digital output indicative of the elements of said complex waveform;
(b) second means for analyzing said complex wave for providing a digital output signal indicative of variations of the elements of said complex waveform;
(c) first output means;
(d) first gating means connecting the output of said first analyzing means to said first output;
(e) second output means;
(f) second gating means connecting the output of said second analyzing means to said second output;
(g) monitoring means connected to the outputs of said analyzing means and responsive to a change in digital data for generating an output signal pulse; and
(h) means responsive to said output signal pulse for operating said gating means to allow digital data from said analyzing means to appear at said outputs.

16. The apparatus of claim 15 wherein said first analyzing means includes:
(a) band selector means for separating said complex waveform into a plurality of bands of frequencies;
(b) integrating pulse shapers connected to said band selectors and responsive to an output signal therefrom over a period of time to generate an output signal pulse and said second analyzing means includes:
(c) an intensity circuit responsive to intensity variations of said complex waveform to generate a digital output signal;
(d) a roughness circuit responsive to changing amplitudes of said complex waveform to generate a digital output signal; and
(e) inflection circuit means responsive to changes in the fundamental frequency of said complex waveform for generating a digital output signal.

17. The apparatus of claim 16 wherein said monitoring means includes:
(a) a transient detector responsive to a change in digital data for generating an output signal pulse;
(b) a change pulse generator connected to said transient detector and responsive to an output signal therefrom for generating a change pulse having a duration approximating the resolution desired in said digital data;
(c) differentiating means connected to said change pulse generator and responsive to the initiation of said change pulse for providing an initiation output signal;
(d) means responsive to said differentiator initiating output signal to generate a sample pulse and apply the same to said second gating means;
(e) said differentiating means being further responsive to the termination of said change pulse to provide a termination output signal; and
(f) means responsive to said termination output signal to generate a sample pulse and apply the same to said first gating means.

18. The apparatus of claim 17 wherein said change pulse generator includes:
(a) means responsive to successive transient detector pulses occurring within the period of said change pulse for extending the period of change pulse,
(b) whereby successive changes in data occurring within said resolution time will delay the termination sample pulse and only data appearing subsequent to the last change will be sampled.

19. The apparatus of claim 18 further including:
(a) clock means for generating an indication of elapsed time;
(b) means for connecting said clock means to said second gating means;
(c) means connecting said termination pulse to said clock for starting the same; and
(d) means responsive to said initiation sampling pulse for stopping said clock.

20. The apparatus of claim 19 including:
(a) a storage for sampled data;
(b) means conditioning said storage to accept each successive set of sampled data;
(c) delay pulse means responsive to the initiation of said change pulse to generate a delay pulse; and
(d) means responsive to the termination of said delay pulse for operating said condition means to condition said storage means to accept the next sampled data.

21. A sound analyzing system comprising:
(a) means for accepting sound waves and generating electrical signals corresponding thereto;
(b) a preamplifier connected to said electrical signal generating means for amplifying said electrical signals to provide an output signal envelope of constant amplitude consisting of all said electrical signals;

(c) a plurality of pre-emphasis amplifiers connected to the output of said preamplifier, each tuned to amplify selected portions of the frequencies contained in said output signal envelope from said preamplifier;
(d) a plurality of frequency band selectors connected to said pre-emphasis amplifiers, each band selector being tuned to detect the presence of preselected contiguous bands of frequencies and provide an output signal indicative of the same;
(e) a plurality of integrating pulse shapers connected to the output of each of said band selectors and responsive to an output signal therefrom over a period of time to generate an output signal pulse indicative of the presence of the band of frequencies;
(f) first output means;
(g) first gating means connecting said integrating pulse shapers to said first output means; and
(h) change responsive means connected to the outputs of said integrating pulse shapers and responsive to changes in data for operating said gating means to connect the output signal of said integrating pulse shapers to said output means.

22. The apparatus of claim 21 further including:
(a) amplifying means contained in said preamplifier and responsive to said electrical signals for generating an output signal;
(b) amplitude detecting means connected to the output of said amplifier and responsive to the magnitude of the amplified signals for generating an output signal whose frequency is indicative of the amplitude of said signals;
(c) an integrating network responsive to the signals generated by said amplitude detecting circuit for generating an output signal voltage indicative of the amplitude of said input signals;
(d) intensity digitizer means responsive to the amplitude of said signal from said integrating circuit for generating a digital output signal indicative of the amplitude of said input signal envelope;
(e) second output means;
(f) second gating means connecting said intensity digitizer to said second output means; and
(g) said change responsive means being connected to the output of said intensity digitizer.

23. The apparatus of claim 22 further including a roughness measure circuit connected to said integrator for determining the roughness in the amplitude variations, said roughness measure circuit comprising:
(a) first means responsive to an increase in said integrator output signal for generating a pulse having a predetermined duration;
(b) second means responsive to a decrease in said integrator output signal for generating a pulse of shorter time duration;
(c) coincidence detecting means connected to said first and second means and responsive to a coincidence of said pulses to generate an output signal therefrom;
(d) pulse responsive means connected to said coincidence circuit to generate an output signal indicative of roughness in the intensity wave in response to an output signal from said coincidence circuit whereby said roughness circuit will detect amplitude variations which rise and fall in sequence; and
(e) means for connecting the output of said pulse responsive means to said second gating means;
(f) said change responsive means being connected to the output of pulse responsive means.

24. The apparatus of claim 23 further including an inflection circuit comprising:
(a) an integrating circuit connected to said amplitude detecting means and responsive to signals of a given frequency for generating an output signal indicative of a steady, rising or falling fundamental frequency;
(b) an inflection detection circuit connected to the output of said integrating circuit and responsive to that output signal for generating digital output signal;
(c) means for connecting the output of said inflection circuit to said second gating; and
(d) said change responsive means being connected to the output of said inflection circuit.

25. The apparatus of claim 24 wherein said change responsive means includes:
(a) a transient detector responsive to a change in digital data for generating an output signal pulse;
(b) a change pulse generator connected to said transient detector and responsive to an output signal therefrom for generating a change pulse having a duration approximating the resolution desired in said digital data;
(c) differentiating means connected to said change pulse generator and responsive to the initiation of said change pulse for providing an initiation output signal;
(d) means responsive to said differentiator initiating output signal to generate a sample pulse and apply the same to said second gating means;
(e) said differentiating means being further responsive to the termination of said change pulse to provide a termination output signal; and
(f) means responsive to said termination output signal to generate a sample pulse and apply the same to said first gating means.

26. The apparatus of claim 25 wherein said change pulse generator includes:
(a) means responsive to successive transient detector pulses occurring within the period of said change pulse for extending the period of change pulse,
(b) whereby successive changes in data occurring within said resolution time will delay the termination sample pulse and only data appearing subsequent to the last change will be sampled.

27. The apparatus of claim 26 further including:
(a) clock means for generating an indication of elapsed time;
(b) means for connecting said clock means to said second gating means;
(c) means connecting said termination pulse to said clock for starting the same; and
(d) means responsive to said initiation sampling pulse for stopping said clock.

28. The apparatus of claim 27 including:
(a) a storage for sampled data;
(b) means conditioning said storage to accept each successive set of sampled data;
(c) delay pulse means responsive to the initiation of said change pulse to generate a delay pulse; and
(d) means responsive to the termination of said delay pulse for operating said condition means to condition said storage means to accept the next sampled data.

References Cited by the Examiner

UNITED STATES PATENTS

| | | | |
|---|---|---|---|
| Re. 24,670 | 7/1959 | Smith | 179—1 |
| 2,946,016 | 7/1960 | Meyer | 330—69 |
| 2,974,289 | 3/1961 | Cockburn | 330—69 |
| 2,996,579 | 8/1961 | Slaymaker | 179—1 |
| 3,007,136 | 10/1961 | Tyrlick | 340—147 |
| 3,020,524 | 2/1962 | Quinn | 340—147 |
| 3,042,864 | 7/1962 | Godbey | 324—77 |
| 3,045,180 | 7/1962 | Losher | 324—77 |

FOREIGN PATENTS 684,318  12/1952  Great Britain.

ROBERT H. ROSE, *Primary Examiner.*

H. W. GARNER, R. MURRAY, *Assistant Examiners.*